United States Patent
Higashi et al.

(10) Patent No.: US 7,551,235 B2
(45) Date of Patent: Jun. 23, 2009

(54) IMAGE SWITCHING APPARATUS AND METHOD OF CONTROLLING IMAGE PROCESSING UNIT THEREOF

(75) Inventors: Humiki Higashi, Kanagawa (JP); Nobuyuki Minami, Kanagawa (JP); Glenn Steven Hill, Park Ridge, NJ (US)

(73) Assignee: Sony Corporation, Tokyo (JP)

( * ) Notice: Subject to any disclaimer, the term of this patent is extended or adjusted under 35 U.S.C. 154(b) by 743 days.

(21) Appl. No.: 11/304,182

(22) Filed: Dec. 15, 2005

(65) Prior Publication Data

US 2007/0140666 A1 Jun. 21, 2007

(51) Int. Cl.
*H04N 5/268* (2006.01)
*H04N 9/74* (2006.01)

(52) U.S. Cl. .................. 348/705; 348/578; 348/584

(58) Field of Classification Search .................. 348/705, 348/706, 578, 594, 595, 584; 715/716–726; *H04N 5/268, H04N 9/74, 9/76*
See application file for complete search history.

(56) References Cited

U.S. PATENT DOCUMENTS 5,047,857 A * 9/1991 Duffield et al. ............. 348/578
5,227,863 A * 7/1993 Bilbrey et al. .............. 348/578
7,420,622 B2 * 9/2008 Higashi et al. .............. 348/578

FOREIGN PATENT DOCUMENTS

| EP | 0 336 712 | 10/1989 |
|----|-----------|---------|
| EP | 1 761 044 | 3/2007 |
| JP | 2004-153486 | 5/2004 |

OTHER PUBLICATIONS

Yagi N et al: "A Programmable Real-Time Video Signal-Processing System", SMPTE Journal, SMPTE Inc. Scarsdale, N.Y., US, vol. 100, No. 11, Nov. 1, 1991, pp. 860-868, XP000213667.

* cited by examiner

*Primary Examiner*—Sherrie Hsia
(74) *Attorney, Agent, or Firm*—Frommer Lawrence & Haug LLP; William S. Frommer

(57) ABSTRACT

An image processing unit of an image switching apparatus includes main circuit blocks (5*a*), (5*b*) and (6) and sub circuit blocks (5*d*), (5*e*) and (7). An operation unit in the image switching apparatus includes a unit for designating one of or both of the main circuit blocks and the sub circuit blocks. When the main circuit block is designated, the operation unit transmits a signal to designate the operation of the main circuit block. When the sub circuit block is designated, the operation unit transmits a signal to designate the operation of the sub circuit block. When both of the main circuit block and the sub circuit block are designated, the operation unit transmits a signal to designate operations of the main circuit block and the sub circuit block. The image switching apparatus can be constructed by a few circuits and such circuits can be efficiently used without waste in response to the change of purposes.

20 Claims, 16 Drawing Sheets

- Available Mode
- Bus Toggle
- Split Fader Enable
- Preset Color Mix
- Fader Curve
- Combination/Output of Backrounds and Key Signals
- Snapshot

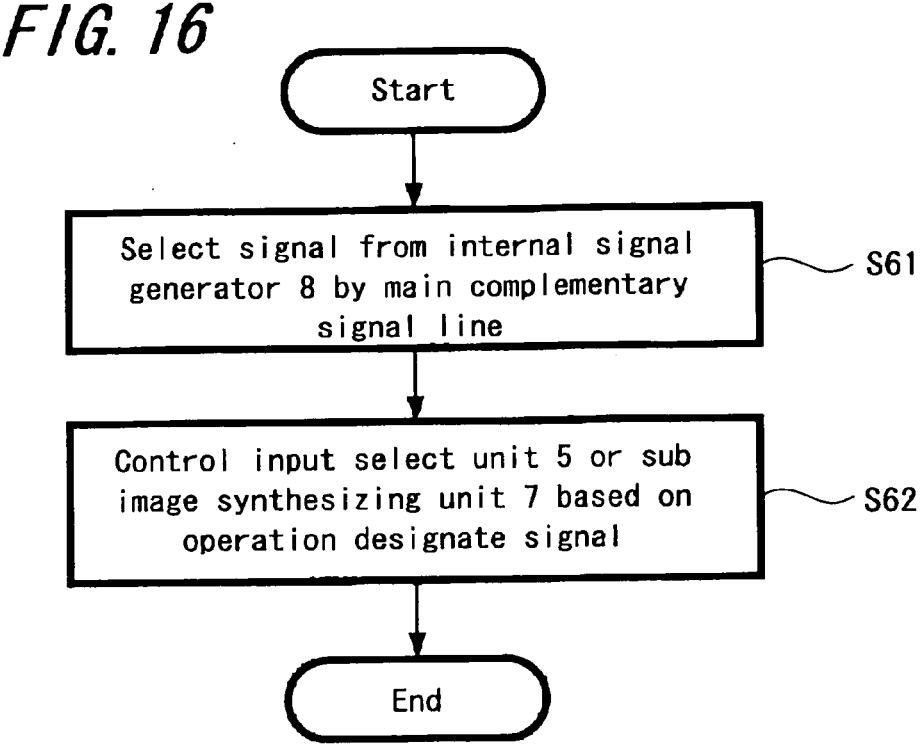
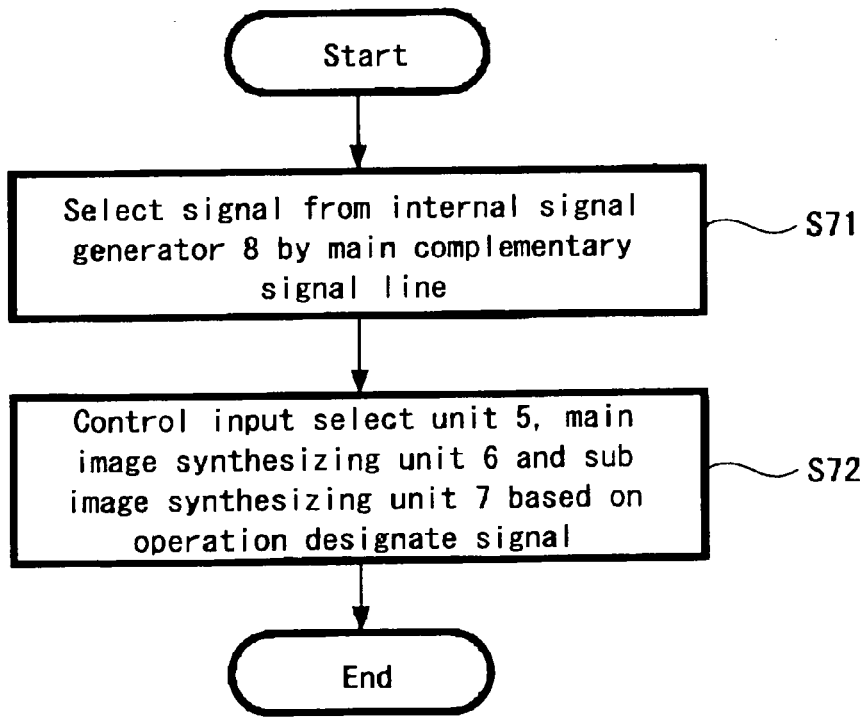

IMAGE SWITCHING APPARATUS AND METHOD OF CONTROLLING IMAGE PROCESSING UNIT THEREOF

BACKGROUND OF THE INVENTION

1. Field of the Invention

The present invention relates generally to an image switching apparatus for switching and outputting a video signal from inputted video signals of a plurality of channels and which is able to perform effects on a video signal when video signals are switched, and particularly to an image switching apparatus by which circuits can be efficiently used without waste in response to a use and a method of controlling an image processing unit of such an image switching apparatus.

2. Description of the Related Art

So far an image switching apparatus (switcher) is available as one of professional apparatus for use in editing pictures in a television broadcast or the like. The image switching apparatus is able to switch and output a video signal from inputted video signals (video signals from a video camera, a VCR (video cassette recorder) and etc.) of a plurality of channels and which is also able to perform a suitable effect such as wipe on a video signal when video signals are switched. An outputted video signal from the image switching apparatus is supplied to television program transmission equipment, a video recording apparatus, a monitor and the like.

In video edit work, it is customary that a video signal of only one channel should be generated or that video signals of a plurality of channels should be generated at the same time. Concurrently therewith, it is requested that the image switching apparatus should have functions that can be used in a variety of purposes.

FIG. 1 of the accompanying drawings is a schematic block diagram showing an example of a related-art image switching apparatus having such functions. As shown in FIG. 1, this image switching apparatus includes a plurality of image processing units 51 (51a to 51d) in which an outputted video signal from one image processing unit 51 is inputted again to other image processing unit 51 as an inputted video signal. Each image processing unit 51 includes an input selection unit 52. The input selection unit 52 includes a matrix-like selection switch group by which input lines 53a to 53j are connected to any of input buses 54a to 54c and it is able to select video signals of one channel each by the input buses 54a to 54c. The video signal selected by the input selection unit 52 is supplied to a synthesis processing unit 55, in which it is applied with effects such as wipe and mix and outputted from an output terminal Output and also inputted again to other image processing unit 51 from input lines 53g to 53j (see Cited Patent Reference 1, for example).

This image switching apparatus selects the input lines 53g to 53j (output video signals of other image processing unit 51) by the input selection unit 52 of the image processing unit 51 and becomes able to generate a video signal of one channel, which has been applied with effects of a plurality of stages, (becomes able to output the video signal of one channel from the output terminal Output of the image processing unit 51 of the final stage) in the state in which the image processing units 51 of a plurality of stages are connected in series.

Also, this image switching apparatus does not use the input lines 53g to 53j by the input selection unit 52 of the image processing unit 51 and hence this image switching apparatus becomes able to generate video signals of a plurality of channels which has been applied with effects (this image switching apparatus becomes able to generate the video signal of one channel from the output terminal Output of the image processing unit 51 of the final stage).

Cited Patent Reference 1: Official Gazette of Japanese laid-open patent application No. 2004-153486 (paragraph Nos. 0048 to 0054 and FIG. 2)

Professional image switching apparatus are very expensive and it is unavoidable that their prices are considerably increased when the number of circuits and the channel between the circuits are increased. For this reason, it is requested not only that the image switching apparatus should have functions which can be used in a variety of purposes and but also that the price of the image switching apparatus should be decreased by decreasing the number of circuits.

However, in the image switching apparatus described in the above-described Cited Patent Reference 1, when video signals, on which simple effect was performed, of channels lesser than the number of the image processing units 51 (for example, video signals of one channel or two channels) are generated, only a part of the image processing units 51 is used and the remaining image processing units 51 are not used at all. As described above, the image processing units 51, which are not used depending on a variety of purposes, should be provided and hence it is difficult to decrease the price of the image switching apparatus.

SUMMARY OF THE INVENTION

In view of the aforesaid aspects, the present invention intends to provide an image switching apparatus which can be used in a variety of purposes.

Further, the present invention intends to provide an image switching apparatus which can be constructed by a few circuits and the like and in which such circuits and elements can be efficiently used without waste in response to the change of purposes.

Further, the present invention intends to provide a method of controlling an image processing unit of an image switching apparatus.

According to an aspect of the present invention, there is provided an image switching apparatus which is comprised of an image processing unit for selecting a video signal from inputted video signals of a plurality of channels and switching an outputted video signal from a certain selected video signal to other selected video signal, a control unit for controlling the image processing unit and an operation unit including operation means connected to the control unit through a communication channel to operate the image processing unit, wherein the image processing unit includes a main circuit block and sub circuit blocks different from the main circuit block as circuit blocks for carrying out the processing, the main circuit block includes designation means for designating that one of the sub circuit blocks is to be operated or that both of the main circuit block and the sub circuit blocks are to be operated, the operation unit transmits a signal to designate operation of the main circuit block to the control unit based on operation of the operation means when the main circuit block is designated by the designation means, the operation unit transmits a signal to designate operation of the sub circuit block to the control unit based on operation of the operation means when the sub circuit block is designated by the designation means and the operation unit transmits a signal to designate operations of both of the main circuit block and the sub circuit block to the control unit based on operation of the operation means when both of the main circuit block and the sub circuit block are designated by the designation means and the control unit controls a circuit of which operation is designated by a signal from the operation unit from the main circuit block and the sub circuit block.

According to another aspect of the present invention, there is provided a method of controlling an image processing unit in an image switching apparatus comprising an image processing unit for selecting a video signal from inputted video signals of a plurality of channels and switching an outputted video signal from a certain selected video signal to other selected video signal, a control unit for controlling the image processing unit and an operation unit including operation means connected to the control unit through a communication channel to operate the image processing unit, wherein the image processing unit includes a main circuit block and sub circuit blocks different from the main circuit block as circuit blocks for carrying out the processing, the main circuit block includes designation means for designating that one of the sub circuit blocks is to be operated or that both of the main circuit block and the sub circuit blocks are to be operated, the operation unit transmits a signal to designate operation of the main circuit block to the control unit based on operation of the operation means when the main circuit block is designated by the designation means. This control method of controlling the image processing unit in an image switching apparatus is comprised of a step in which the operation unit transmits a signal to designate operation of the sub circuit block to the control unit based on operation of the operation means when the sub circuit block is designated by the designation means and the operation unit transmits a signal to designate operations of both of the main circuit block and the sub circuit block to the control unit based on operation of the operation means when both of the main circuit block and the sub circuit block are designated by the designation means and a step in which the control unit controls a circuit of which operation is designated by a signal from the operation unit from the main circuit block and the sub circuit block.

According to the present invention, the image processing unit includes the two blocks of the main circuit block and the sub circuit block as the circuit blocks for selecting and inputted video signals and switching outputted video signals. Then, at least a part of the circuit of the sub circuit block is formed as the common circuit which is available as a part of the main circuit block.

The designation means in the operation unit is able to designate that any one of the main circuit block and the sub circuit block is to be operated or that both of the circuit block and the sub circuit block are to be operated.

When the main circuit block is designated by the designation means, the operation unit transmits the signal to designate the operation of the main circuit block to the control unit based on the operation of the operation means. Then, the control unit controls the main circuit block based on this signal from the operation unit.

Also, when the sub circuit block is designated by the designation means, the operation unit transmits the signal to designate the operation of the sub circuit block (including the common circuit) to the control unit based on the operation of the operation means. Then, the control unit controls the sub circuit block based on this signal from the operation unit.

Therefore, in these cases, it is possible to generate the video signal of one channel by operating the main circuit block and the common circuit and also it is possible to generate the video signal of one channel by operating the sub circuit block.

On the other hand, when both of the main circuit block and the sub circuit block are designated by the designation means, the operation unit transmits the signal to instruct operations of both of the main circuit block and the sub circuit block to the control unit based on the operation of the operation means.

Then, the control unit controls both of the main circuit block and the sub circuit block based on this signal from the operation unit.

Therefore, in this case, it is possible to generate the video signal of one channel by operating the main circuit block and also it is possible to generate the video signal of one channel by operating the sub circuit block.

As described above, one image processing unit within the same image switching apparatus can be used for the purpose of generating the video signal of one channel by only one of the main circuit block and the sub circuit block and it can also be used for the purpose of generating the video signals of two channels by both of the main circuit block and the sub circuit block.

Thus, not only the image switching apparatus can be used in a variety of purposes but also the image switching apparatus can be constructed by a few circuits and such circuits can be efficiently used without waste in response to the change of purposes (for example, the video output lines of the limited number within the image switching apparatus can be made common to the main circuit block and the sub circuit block).

According to the present invention, not only the image switching apparatus can be used in a variety of purposes but also the image switching apparatus can be constructed by a few circuits and such circuits can be efficiently used without waste in response to the change of purposes.

BRIEF DESCRIPTION OF THE DRAWINGS

FIG. 16 is a flowchart to which reference will be made in explaining processing executed by the control unit of the switcher body in the half-divide mode;

FIG. 17 is a flowchart to which reference will be made in explaining processing executed by the control unit of the switcher body in the half-divide mode;

DESCRIPTION OF THE PREFERRED EMBODIMENTS

The present invention will be described below in concrete with reference to the drawings.

Figure 1:
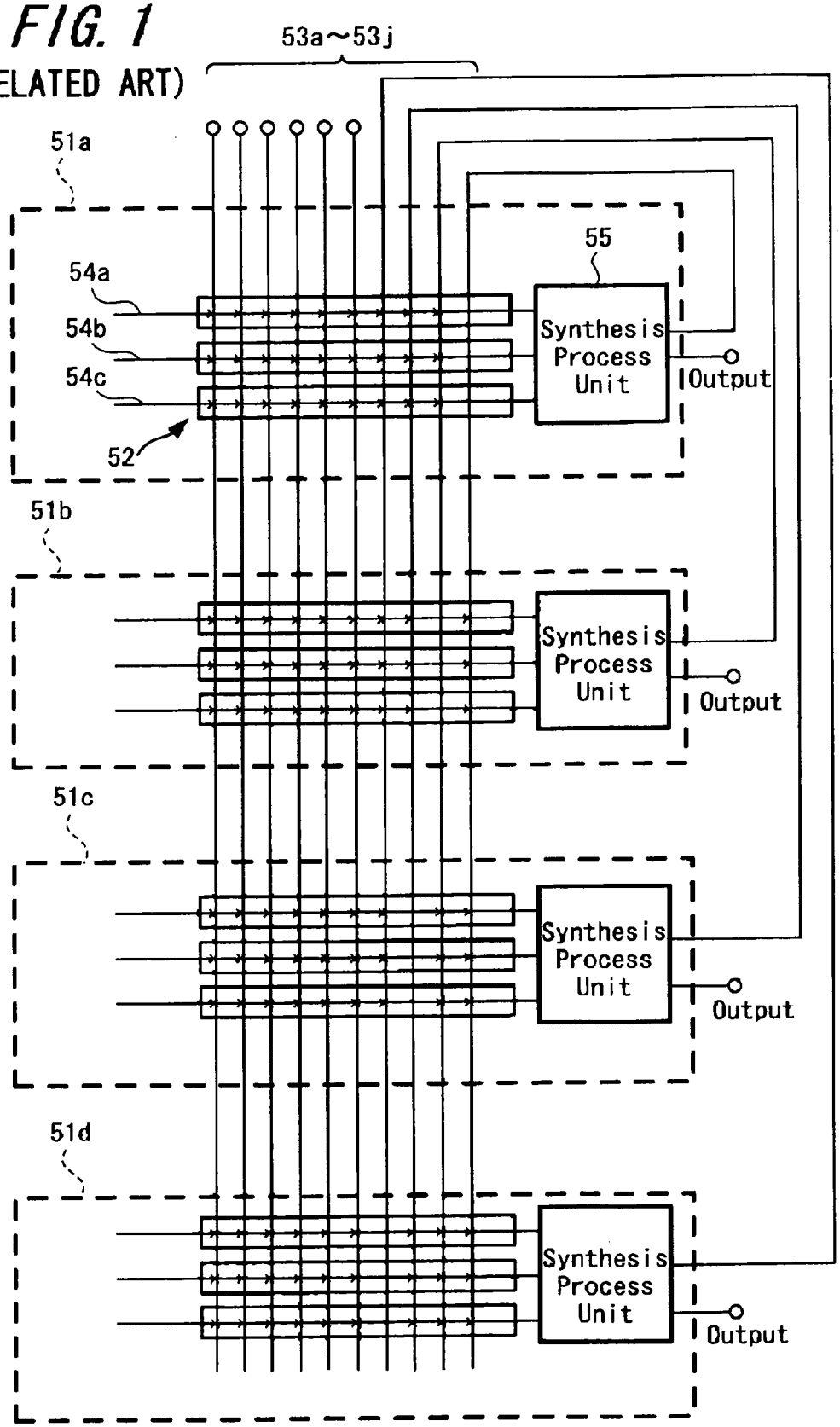
FIG. 1 is a schematic block diagram showing an example of an arrangement of an image switching apparatus according to the related art.
Figure 2:
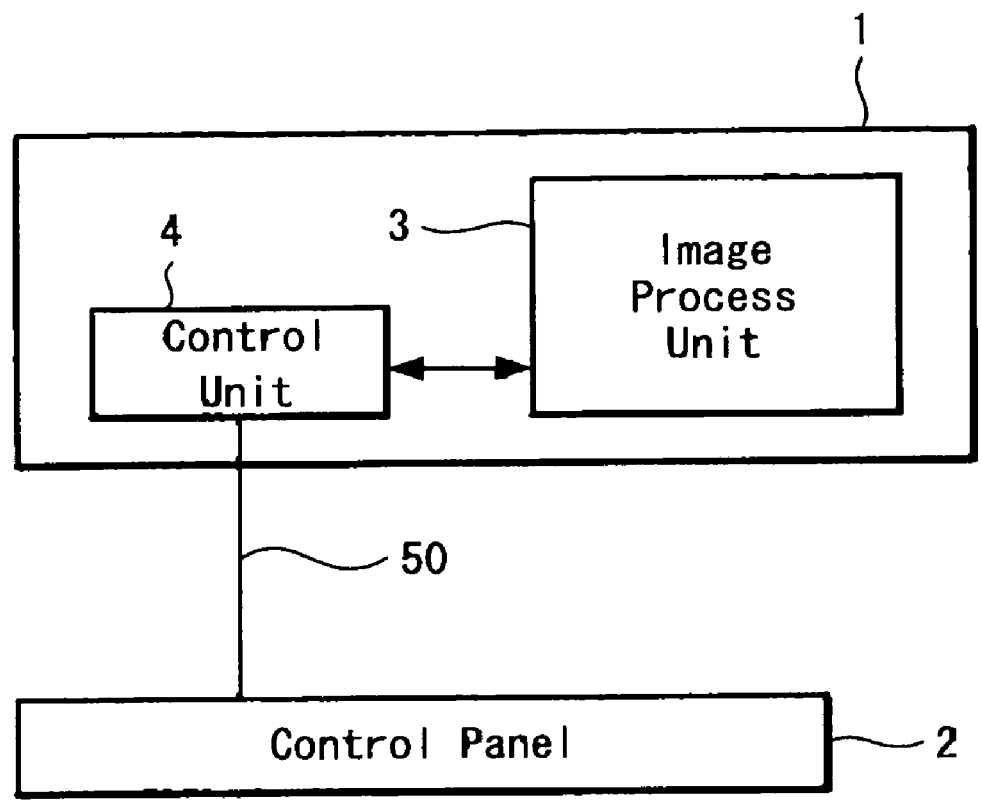
FIG. 2 is a schematic block diagram showing an overall arrangement of an image switching apparatus according to the present invention.

FIG. 2 is a schematic diagram showing an overall arrangement of an image switching apparatus (switcher) according to the present invention. As shown in FIG. 2, this image switching apparatus is composed of a switcher body 1 and a control panel 2.

The switcher body 1 and the control panel 2 are connected together by a communication channel 50 such as a network (LAN (local area network)).

The switcher body 1 includes therein an image processing unit 3 and a control unit 4 for controlling the image processing unit 3. The control unit 4 is composed of a microcomputer and a communication interface and hence the control unit 4 can communicate with the control panel 2 through the communication channel 50.

Figure 3:
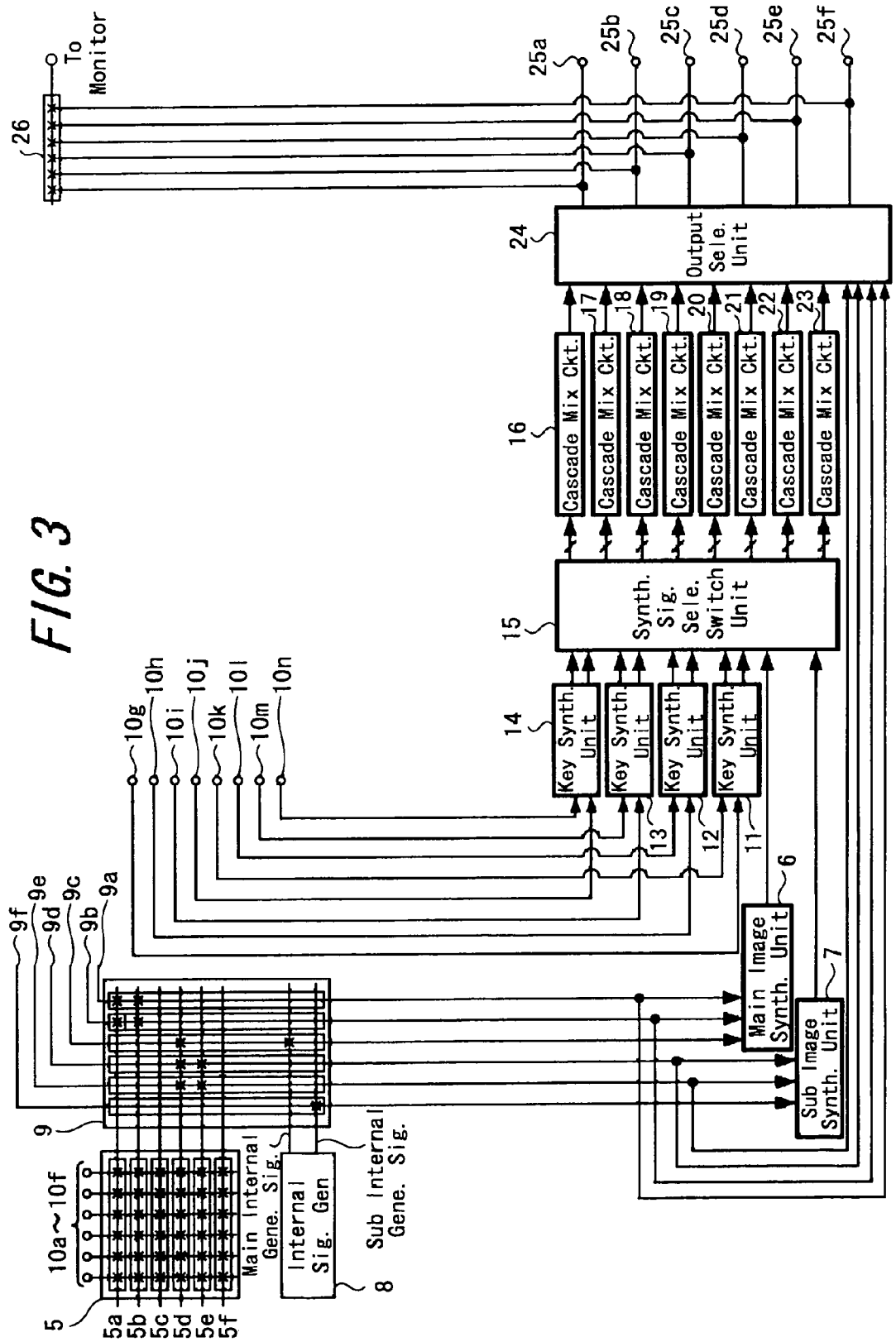
FIG. 3 is a schematic block diagram showing a circuit arrangement of an image processing unit shown in FIG. 2.

FIG. 3 is a schematic block diagram showing a circuit arrangement of the image processing unit 3. As shown in FIG. 3, the image processing unit 3 includes an input selection unit 5, a main image synthesizing unit 6, a sub image synthesizing unit 7, an internal signal generator 8, a synthesize selection unit 9, key synthesizing units 11 to 14, a synthesized signal selection and switch unit 15, cascade mix units 16 to 23, an output selection unit 24 and a preview selection unit 26.

Video signals of a plurality of channels (video signals from a video camera, a VTR (video tape recorder), etc.) are inputted to the switcher body 1 from input lines 10a to 10f. The input selection unit 5 includes matrix-like selection switch groups to connect the respective input lines 10a to 10f to six input buses 5a to 5f and it is able to select video signals of one channel each by the input buses 5a to 5f.

The input buses 5a, 5b and 5c of the input buses 5a to 5f are main input buses (main input bus 1, main input bus 2 and spare main input bus).

Also, the input buses 5d, 5e and 5f of the input buses 5a to 5f are sub input buses (sub input bus 1, sub input bus 2 and spare sub input bus). The sub input bus 5d (sub input bus 1) of these sub input buses 5d, 5e and 5f is a common input bus that may serve as a part of the main input bus as well.

Figure 4A:
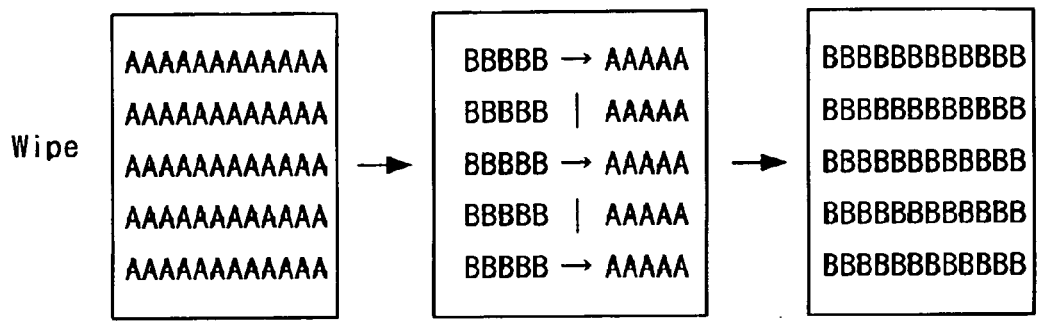
FIGS. 4A, 4B and 4C are diagrams showing specific examples of effects exerted on images by a main image synthesizing unit and a sub image synthesizing unit shown in FIG. 3, respectively.
Figure 4B:
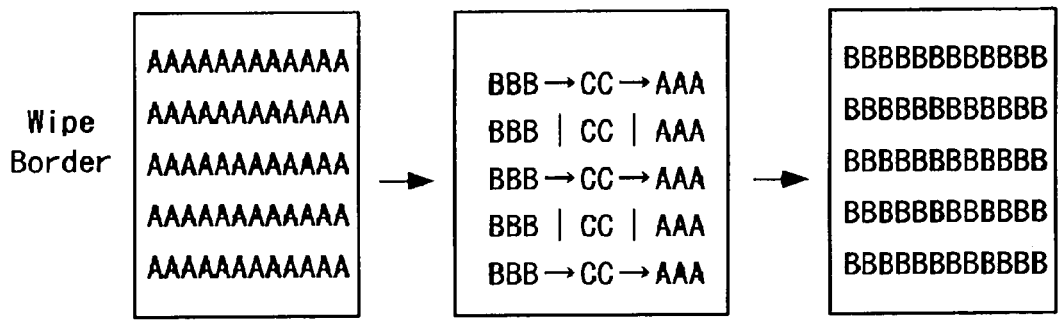
Figure 4C:
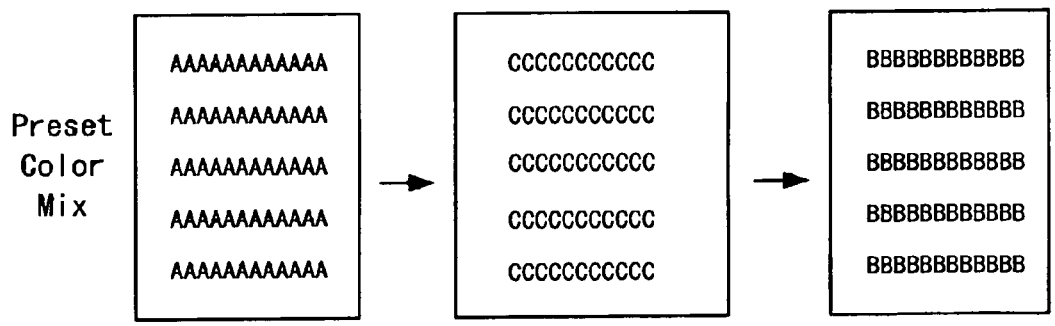

The main image synthesizing unit 6 and the sub image synthesizing unit 7 are those which can perform effects such as wipe on a video signal when two video signals supplied from the synthesize selection unit 9 are switched (present video signal is switched to the next video signal) as will be described later on. FIGS. 4A, 4B and 4C show specific examples of these effects made on the video signals.

FIG. 4A shows a specific example of effect, that is, "wipe" performed on the video signal. "Wipe" is processing in which a picture displayed on the screen is swapped from the state in which only the present video signal (expressed by a set of characters "A") is displayed like the left end picture, it is progressively swapped with the next video signal (expressed by a set of characters "B") like the central picture and it is finally swapped with the next video signal completely like the right end picture.

FIG. 4B shows an effect called a wipe border performed on the video signal. "Wipe border" is processing in which a third video signal (expressed by a set of characters "C") is sandwiched between the present video signal (expressed by a set of characters "A") and the next video signal (expressed by a set of characters "B") like the central picture when the wipe shown in FIG. 4A is performed. This third video signal is called a wipe border fill (Wipe Border Fill).

FIG. 4C shows an example of an effect called a preset color mix performed on the video signal. The preset color mix is processing in which only a video signal of a predetermined single color (expressed by a set of characters "C") different from the present and next video signals is displayed like the central picture after the state in which only the present video signal (expressed by a set of characters "A") is displayed like the left end picture, whereafter only the next video signal (expressed by a set of characters "B") is displayed like the right end picture.

The internal signal generator 8 shown in FIG. 3 is a circuit in which 2 channels of a video signal of a single color such as blue and red or a video signal produced by mixing two colors are generated within the switcher body 1 (outputted as a main internal generated signal and a sub internal generated signal).

Key source signals of a plurality of channels (signal/alpha indicative of character shape of credits) and key fill signals (video signals indicative of solid color information and the like such as characters) also are inputted to the switcher body 1 from input lines 10g to 10j and input lines 10k to 10n. The key source signal inputted from the input line 10g and the key fill signal inputted from the input line 10k are supplied to the key processing unit 11. The key source signal inputted from the input line 10h and the key fill signal inputted from the input line 10l are supplied to the key processing unit 12. The key source signal inputted from the input line 10i and the key fill signal inputted from the input line 10m are supplied to the key processing unit 13. The key source signal inputted from the input line 10j and the key fill signal inputted from the input line 10n are supplied to the key processing unit 14.

The key processing units 11 to 14 are circuits for processing the key source signal and the key fill signal supplied thereto so as to generate the key signal by which characters and the like may be superimposed on a picture within the screen.

The synthesize selection unit 9 includes six output lines of a main present output signal line 9a, a main next output signal line 9b, a main complementary signal line 9c, a sub present output signal line 9d, a sub next output signal line 9e and a sub complementary signal line 9f.

The main present output signal line 9a is a line by which the present video signal expressed by the set of the characters "A" shown in FIGS. 4A to 4C is supplied to the main image synthesizing unit 6. The main next output signal line 9b is a line by which the next video signal expressed by the set of the characters "B" shown in FIGS. 4A to 4C is supplied to the main image synthesizing unit 6. The main complementary signal line 9c is a line by which the video signal of the single color obtained in the wipe border fill expressed by the set of the characters "C" shown in FIG. 4B and the preset color mix expressed by the set of the characters "C" in FIG. 4C and the like is supplied to the main image synthesizing unit 6.

The sub present output signal line 9*d* is a line by which the present video signal is supplied to the sub image synthesizing unit 7. The sub next output signal line 9*e* is a line by which the next video signal is supplied to the sub image synthesizing unit 7. The sub complementary signal line 9*f* is a line by which the wipe border fill, the video signal of the single color and the like are supplied to the sub image synthesizing unit 7.

The main present output signal line 9*a* and the main next output signal line 9*b* include selection switches to select any of the video signal from the input bus 5*a* (main input bus 1) and the video signal from the input bus 5*b* (main input bus 2) of the input selection unit 5, respectively.

The main complementary signal line 9*c* includes a selection switch to select any of the video signal from the input bus 5*d* (sub input bus 1 which is the common input bus) of the input selection unit 5 and the main internal generated signal from the internal signal generator 8.

The sub present output signal line 9*d* and the sub next output signal line 9*e* include selection switches to select any of the video signal from the input bus 5*d* (sub input bus 1) and the video signal from the input bus 5*e* (sub input bus 2) of the input selection unit 5.

The sub complementary signal line 9*f* includes a selection switch to select only a sub internal generated signal from the internal signal generator 8.

Video signals (which will be referred to as a main background picture and a sub background picture, respectively) outputted from the main image synthesizing unit 6 and the sub image synthesizing unit 7 and key signals of 4 channels synthesized by the key processing units 11 to 14 are supplied to a synthesized signal selection and switch unit 15. The synthesized signal selection and switch unit 15 is a circuit which is used to determine eight groups of combinations, at maximum, of the video signals (main background picture and sub background picture) and the key signals superimposed on the video signals.

The video signals and the key signals of each group of which combination was determined by the synthesized signal selection and switch unit 15 are supplied to any of the cascade mix circuits 16 to 23 of 8 systems. Each of the cascade mix circuits 16 to 23 is a circuit by which the supplied key signal is superimposed on the supplied video signal.

Figure 5:
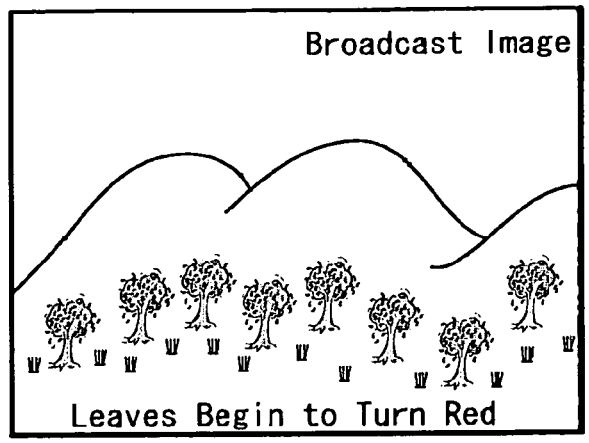
FIG. 5 is a pictorial representation showing an example in which a key signal is superimposed on a video signal.

FIG. 5 is a diagram showing an example of the state in which key signals are superimposed on the video signal. As shown in FIG. 5, in this example, two key signals of a key signal expressing characters of "broadcast image" on the upper right of the picture and a key signal expressing characters of "leaves begin to turn red" on the lower side of the picture are superimposed on the video signal.

As shown in FIG. 3, the video signals on which the key signals are superimposed by the cascade mix circuits 16 to 23 are supplied to the output selection unit 24. Also, the output selection unit 24 is directly supplied with the video signals selected by the main present output signal line 9*a*, the main next output signal line 9*b*, the sub present output signal line 9*d* and the sub next output signal line 9*e* of the synthesize selection unit 9 (that is, the present video signal and the next video signal used by the main image synthesizing unit 6 to generate the main background picture and the present video signal and the next video signal used by the sub image synthesizing unit 7 to generate the sub background picture). The output selection unit 24 is the circuit by which video signals of 6 channels, at maximum, are selected from these supplied video signals and the supplied video signals of respective channels are supplied to any of the respective output lines 25*a* to 25*f*.

The video signals transmitted to the respective output lines 25*a* to 25*f* are outputted to the outside of the switcher body 1 and they are also supplied to the preview selection unit 26. The preview selection unit 26 includes a selection switch to select a video signal of any one line of the output lines 25*a* to 25*f* as a preview video signal. The video signal selected by the preview selection switch 26 is supplied to a preview monitor (not shown).

In this image processing unit 3, the input buses 5*a*, 5*b*, 5*c* (main input bus 1, main input bus 2 and spare main input bus) of the input selection unit 5 and the main image synthesizing unit 6 correspond to the main circuit block. Also, the input buses 5*d*, 5*e*, 5*f* (sub input bus 1, sub input bus 2 and spare sub input bus) of the input selection unit 5 and the sub image synthesizing unit 7 correspond to the sub circuit block. The input bus 5*d* (sub input bus 1) corresponds to the common circuit.

The control panel 2 shown in FIG. 2 is used by the operator to operate the image processing unit 3 of the switcher body 1 or to make the setting to operate the image processing unit 3.

Figure 6:
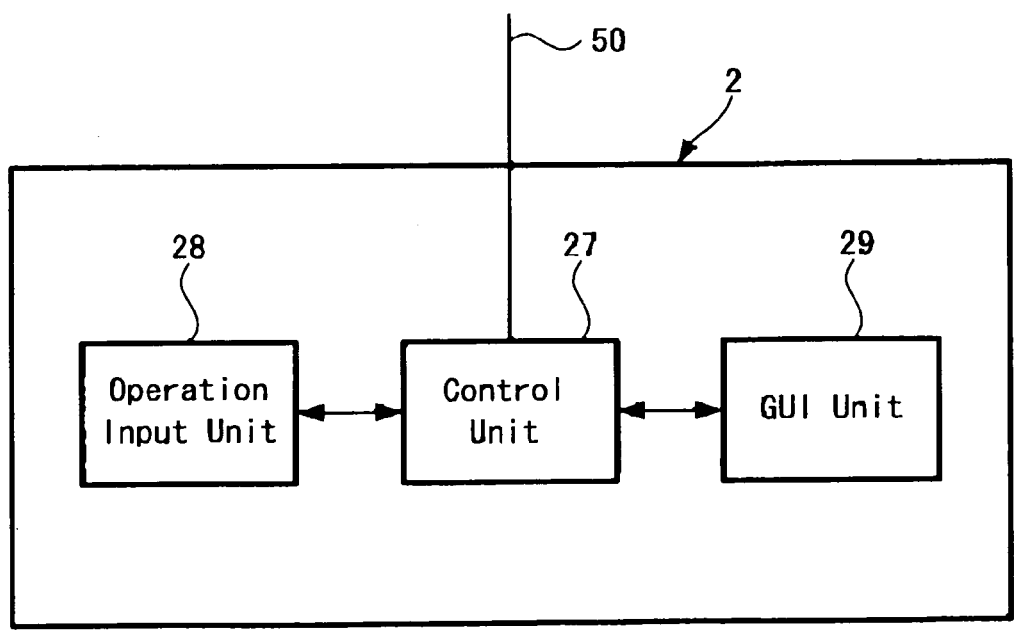
FIG. 6 is a schematic block diagram showing a circuit arrangement of a control panel shown in FIG. 2.

The circuit arrangement of the control panel 2 is outlined in FIG. 6. As shown in FIG. 6, the control panel 2 is provided with a control unit 27, an operation input unit 28 and a GUI (graphical user interface) 29. The control unit 27 is composed of a microcomputer and a communication interface and it is communicated with the control unit 4 within the switcher body 1 through the communication channel 50 shown in FIG. 2.

Figure 7:
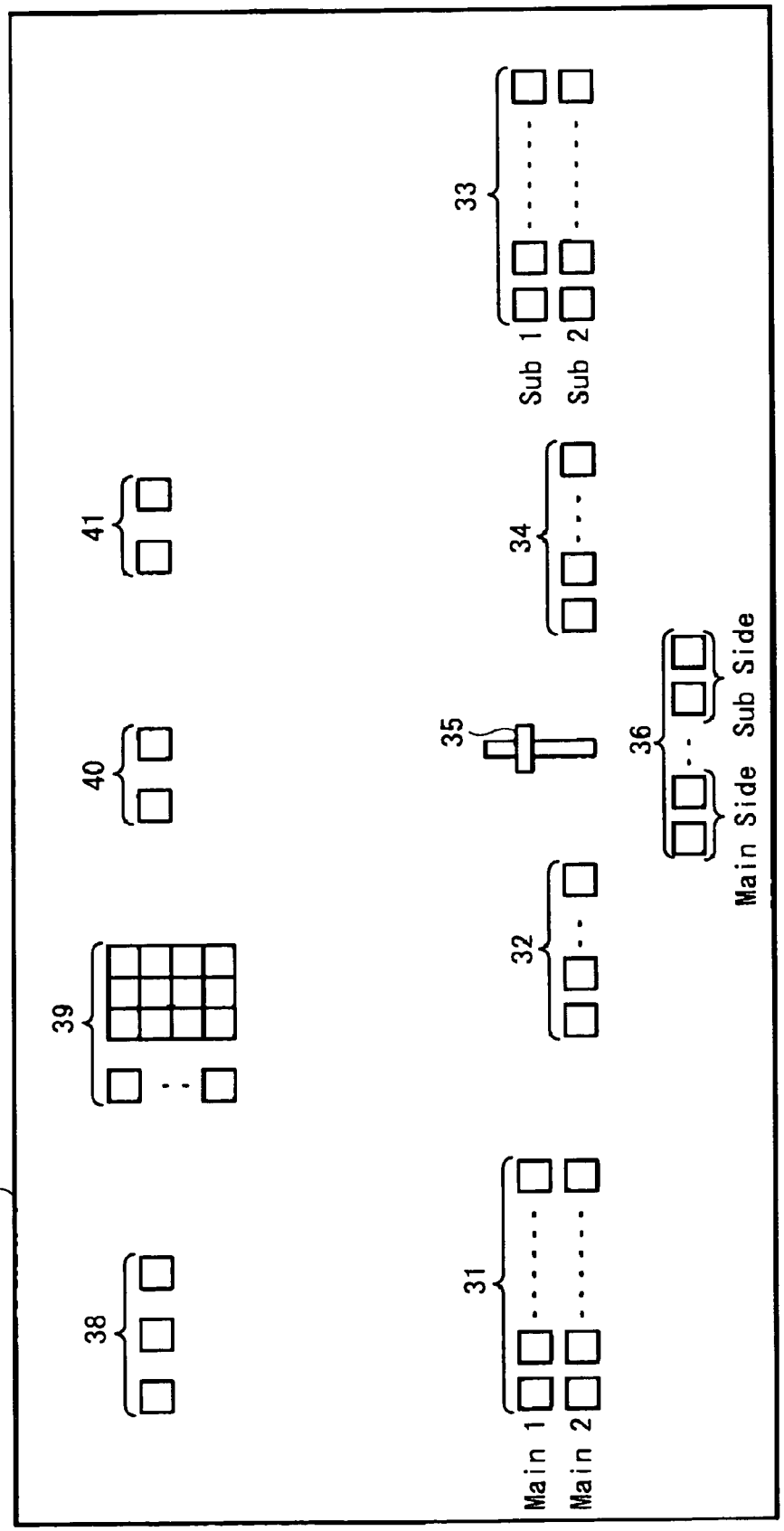
FIG. 7 is a schematic diagram showing suitable elements such as buttons provided on the operation input unit shown in FIG. 6.

The operation input unit 28 is provided with various kinds of buttons, lever and the like which are used by the operator to perform operations to operate the image processing unit 3 in actual practice. FIG. 7 is a diagram schematically showing portions relating to the present invention in the buttons and the like provided on the operation input unit 28.

As shown in FIG. 7, main input video selection buttons 31 are a plurality of push buttons to select video signals by the input buses 5*a* and 5*b* (main input bus 1 and main input bus 2) of the input selection unit 5 shown in FIG. 3.

Main effect selection buttons 32 are a plurality of push buttons to select the kind of effects (wipe and the like shown in FIGS. 4A to 4C) performed at the main image synthesizing unit 6 shown in FIG. 3.

Sub input video selection buttons 33 are a plurality of buttons to select the video signals by the input buses 5*d* and 5*e* (sub input bus 1 and sub input bus 2) of the input selection unit 5.

Sub effect selection buttons 34 are a plurality of push buttons to select the kind of effects at the sub image synthesizing unit 7 shown in FIG. 3.

A fader lever 35 is a lever which is used to manually change a ratio between the present video signal and the next video signal and a speed to change such ratio when effects are performed on the video signals at the main image synthesizing unit 6 and the sub image synthesizing unit 7.

Figure 8:
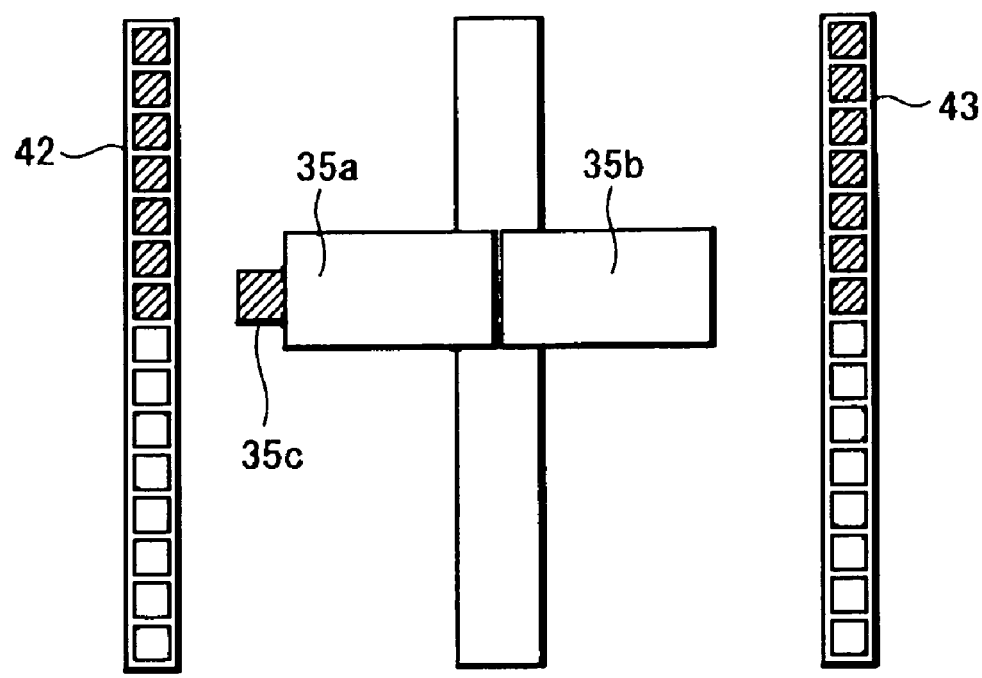
FIG. 8 is a diagram showing in detail the outside appearance of the operation input unit shown in FIG. 7.

FIG. 8 is a diagram showing in detail the outside appearance of the portion of this fader lever 35. As shown in FIG. 8, the fader lever 35 is composed of left and right two levers 35*a* and 35*b* and a joint button 35*c*. The lever 35*a* is used to adjust a ratio of the current video signal and a speed at which the above ratio is changed when effects are performed on the video signal by the main image synthesizing unit 6 and the sub image synthesizing unit 7. The lever 35*b* is used to adjust a ratio of the next video signal and a speed at which the above ratio is changed when effects are performed on the video signal by the main image synthesizing unit 6 and the sub image synthesizing unit 7.

The joint button 35c is used to switch the state in which these levers 35a and 35b are joined as one body (state in which these levers 35a and 35b are moved at the same time) and the state in which these levers 35a and 35b are separated from each other (state in which the levers 35a and 35b can be moved separately). When the joint button 35c is pushed in the axial direction (lateral direction in FIG. 8) of the button, the levers 35a and 35b are joined as one body. When the joint button 35c is pushed one more time, the levers 35a and 35b are separated from each other. When these levers 35a and 35b are joined as one body and moved at the same time, as shown in FIGS. 4A to 4C, the ratio of the next video signal is increased as the ratio of the current video signal is decreased.

The case in which the levers 35a and 35b are separated from each other and moved separately will be described later on in association with the setup at the GUI unit 29.

Two indicators 42 and 43 are provided at the left and right of the fader lever 35. These indicators 42 and 43 are used to display the synthesized ratio based on the moved amount of the fader lever 35 by LEDs (light-emitting diodes), respectively. The indicator 42 is an indicator exclusively-designed for the main circuit block and the indicator 43 is an indicator exclusively-designed for the sub circuit block.

As described above, since the main circuit block and the sub circuit block are respectively provided with the exclusively-designed two indicators 42 and 43 to constantly display the respective states of the circuit blocks, it is possible for the operator to visually confirm with ease the present states of both of the main circuit block and the sub circuit block and whether or not any of the main circuit block and the sub circuit block is changed (or whether or not both of the main circuit block and the sub circuit block are changed) while the operator is operating one fader lever 35.

In FIG. 7, a preview selection button 36 is a button which is used by the preview selection unit 26 shown in FIG. 3 to select the preview video signal. The preview selection button 36 is divided into a button group (main side) used to select previews of the main circuit block and a button group (sub side) used to select previews of the sub circuit block. In the standard mode which will be described later on, it is possible to select previews by using the button group of the main side. Also, in the half-divide mode which will be described later on, both of the button group of the main side and the button group of the sub side can be used and previews of the sub side also can be selected. The manner in which the button group of the main side and the button group of the sub side may be used separately will be described in detail in association with the setup at the GUI unit 29 later on.

Circuit block designation buttons 38 are a plurality of push buttons which are used to designate the manner in which any one of the main circuit block and the sub circuit block should be controlled in the half-divide mode, which will be described later on, and the manner in which both of the main circuit block and the sub circuit block should be controlled.

When the main circuit block is designated by the circuit block designation button 38 (this relationship will apply for the standard mode, which will be described later on, as well), the control unit 27 (FIG. 6) within the control panel 2 transmits a signal which changes a ratio between the present video signal and the next video signal at the main image synthesizing unit 6 to the control unit 4 (FIG. 2) within the switcher body 1 in response to the operation of the fader lever 35.

Also, when the sub circuit block is designated by the circuit block designation button 38, the control unit 27 transmits a signal which changes the ratio between the present video signal and the next video signal at the sub image synthesizing unit 7 to the control unit 4 in response to the operation of the fader lever 35.

Also, when both of the main circuit block and the sub circuit block are designated by the circuit block designation button 38, the control unit 27 transmits a signal which changes the ratios between the present video signal and the next video signal at the main image synthesizing unit 6 and the sub image synthesizing unit 7 at the same time to the control unit 4 in response to the operation of the fader lever 35.

Macro buttons 39 are a plurality of push buttons for macro function and ten keys. The macro function is a function in which data indicative of the operation procedure done by the operator in the operation input unit 28 is stored in advance in a memory within the control unit (FIG. 6), data of this operation procedure being read out from the memory according to the necessity to automatically execute the operations of the same operation procedure.

Since complex operation procedures can be stored in the memory in advance by this macro function, it is possible to decrease the number of procedures of the operations and to prevent mis-operation when the image processing unit 3 is operated in actual practice.

A memory area to register data indicative of the operation procedure is called a macro register. There are prepared 99 macro register of which register numbers are 1 to 99. The macro buttons 39 include ten keys to input these register numbers, a macro registration button to register data of the operation procedure to the macro register of the register number entered by the ten keys (macro registration) and a macro execution button to read the data of the operation procedure from the macro register of the register number entered by the ten keys to thereby execute the operation based on the operation procedure (to execute macro).

Although the macro function itself is a well-known function, the present invention is characterized in that upon macro registration, the control unit 27 registers data indicative of the operation of the fader lever 35 in the operation procedure on the macro register together with data which indicates the circuit block that has been designated by the circuit block designation button 38 at that time point (for example, when the main circuit block is designated by the circuit block designation button 38, data indicating that the main circuit block was designated is registered on the macro register).

Then, during macro is executed, regardless of the circuit block designated by the circuit block designation button 38 when the macro is executed, the control unit 27 judges that the operation of the fader lever 35 in the operation procedure read out from the macro register is the operation performed on the circuit block designated by the circuit block designation button 38 at the time point in which macro is registered and transmits a signal to operate the image processing unit 3 to the control unit 4 (FIG. 2) within the switcher body 1. For example, when the main circuit block is designated by the circuit block designation button 38 at the time point in which macro is registered, even if the sub circuit block is designated by the circuit block designation button 38 at the time point in which macro is executed, the control unit 27 transmits a signal to operate not the sub image synthesizing unit 7 but the main image synthesizing unit 6 to the control unit 4 (FIG. 2) within the switcher body 1.

Consequently, even when the state in which the circuit block is designated by the circuit block designation button 38 is different upon macro registration and macro execution, the operation based on the operation procedure upon macro registration can be executed with fidelity.

In FIG. 7, snapshot buttons 40 are snapshot function buttons. The snapshot function is a function to store the setting state (setting items will be described later on) set by the GUI unit 29 at an arbitrary time point as data and to recall the present setting state to the setting state thus retained in the past time point. The snapshot buttons 40 include a push button (Store button) to store this setting state and a recall push button (Recall button).

Copy/swap buttons 41 are copy function and swap function buttons. The copy function is a function to copy the control state such as the present setting state of one of the main circuit block and the sub circuit block at the GUI unit 29 to the remaining one of the main circuit block and the sub circuit block. The swap function is a function to replace (swap) the present control state of the main circuit block and the present control state of the sub circuit block at the GUI unit 29 with each other. The copy/swap buttons 41 include a copy push button and a swap push button. Processing executed by the control unit 27 within the control panel 2 when the copy/swap buttons 41 are operated will be described later on in association with the setup at the GUI unit 29. In the case of a switcher including a plurality of image processing units 3, copy and swap among the main circuit blocks and the sub circuit blocks of different image processing units can be realized by a similar method.

The GUI unit 29 shown in FIG. 6 is used to perform various settings (setups) to operate the image processing unit 3 before the image processing unit 3 is operated in actual practice. Although not shown, the GUI unit 29 is composed of a liquid-crystal display with a touch panel and the operator is able to perform the setup on the GUI picture displayed on this liquid-crystal display.

Figures 9, 10:
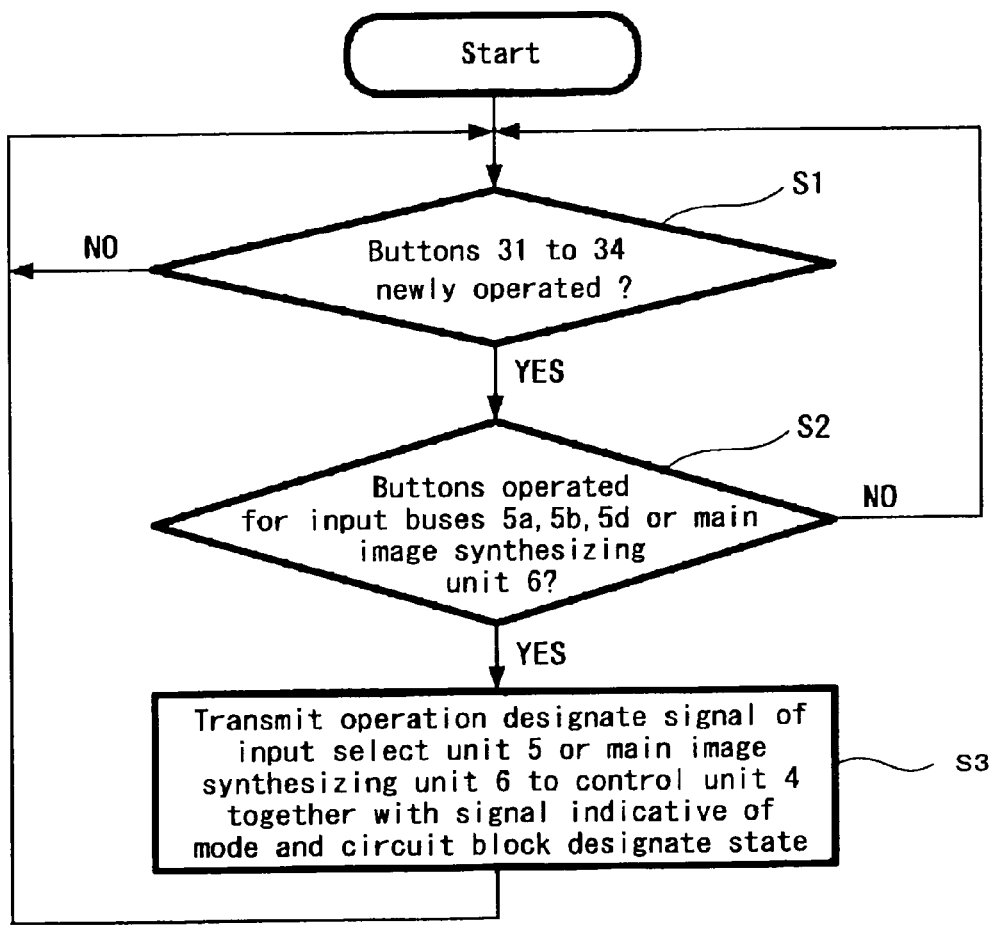
FIG. 9 is a diagram showing setup items on a GUI unit shown in FIG. 6.
FIG. 10 is a flowchart to which reference will be made in explaining processing executed by a control unit of a control panel in the standard mode.

FIG. 9 is a diagram showing a part of items of setups performed at this GUI unit 29. Individual setup items will be described below.

"Available Mode"

"Available mode" is an item to set the available mode of the image processing unit 3 to any one of standard mode and half-divide mode.

"Standard Mode"

"Standard mode" is a mode in which the main circuit block of the main circuit block (input buses 5a and 5b (main input bus 1 and main input bus 2 shown in FIG. 3) and main image synthesizing unit 6) of the image processing unit 3 and the sub circuit block (input buses 5d and 5e (sub input bus 1 and sub input bus 2) and sub image synthesizing unit 7 of the input selection unit 5 shown in FIG. 3) is operated, the input bus 5d (sub input bus 1) of the input selection unit serving as the common circuit is operated as a part of the main circuit block and the remaining sub circuit block is not operated.

"Half-Divide Mode"

"Half-divide mode" is a mode in which both of the main circuit block and the sub circuit block are operated at the same time and in which the circuit block in the main circuit block and the sub circuit block and which was designated by the circuit block designation button 38 on the operation input unit 28 is set to an operation controlled target.

While the control unit 27 (FIG. 6) within the control panel 2 transmits a signal corresponding to the operation of the operation input unit 28 to the control unit 4 (FIG. 2) within the switcher body 1, the control unit 27 executes processing shown in the flowcharts of FIGS. 10 to 14 in response to the setting result of the available mode and the designated result brought by the circuit block designation button 38 in the half-divide mode with respect to operations of a main input video selection button 31, a main effect selection button 32, a sub input video selection button 33 and a sub effect selection button 34.

FIG. 10 is a flowchart showing processing in the standard mode. Referring to FIG. 10 and following the start of operation, in the standard mode, it is determined at a decision step S1 whether or not the main input video selection button 31, the main effect selection button 32, the sub input video selection button 33 or the sub effect selection button 34 is newly operated. If a YES is outputted at the decision step S1, then control goes to the next decision step S2, whereat it is determined whether or not such operation is made with respect to the operation of the input video selection button 31 (that is, operation concerning the input buses 5a and 5b (main input bus 1 and main input bus 2)), operation concerning the input bus 5d (sub input bus 1) at the sub input video selection button 33 or the operation concerning the operation of the main effect selection button 32 (that is, operation concerning the main image synthesizing unit 6).

If a YES is outputted at the decision step S2, then control goes to a step S3, whereat the control unit 27 transmits a signal to instruct the operation of the input buses 5a, 5b, 5d of the input selection unit 5 or the main image synthesizing unit 6 to the control unit 4 within the switcher body 1 together with a signal indicating the designated state of the present circuit block at the circuit block designation button 38 in the present available mode and the half-divide mode (that is, a signal indicative of the standard mode). Then, control goes back to the step S1. If on the other hand a NO is outputted at the decision step S2, then the control unit 27 does not transmit a signal to the control unit 4 and control goes back to the step S1.

Figure 11:
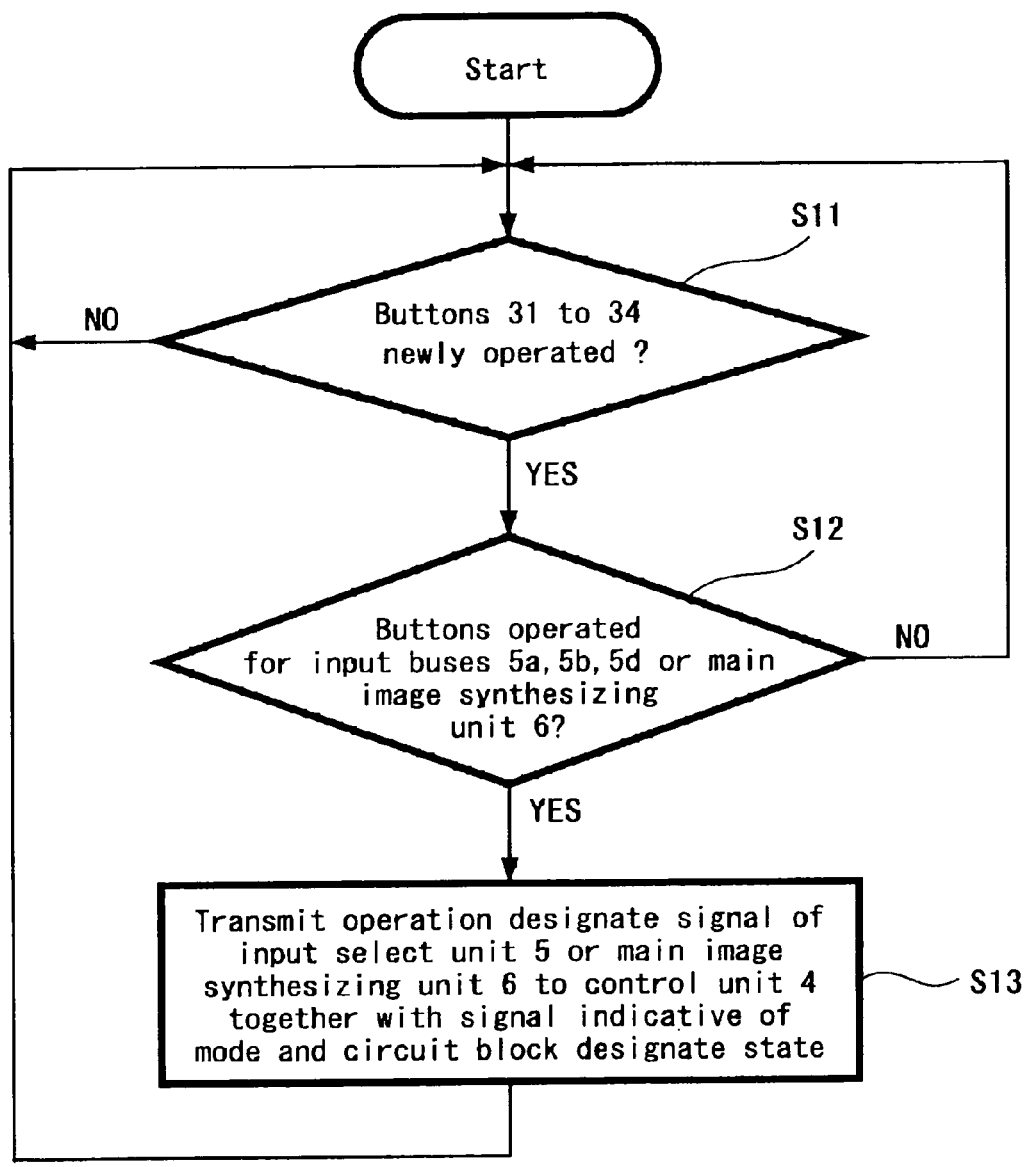
FIG. 11 is a flowchart to which reference will be made in explaining processing executed by the control unit of the control panel in the half-divide mode.

FIG. 11 is a flowchart showing processing executed when the main circuit block is designated by the circuit block designation button 38 in the half-divide mode. Referring to FIG. 11 and following the start of operation, it is determined at a decision step S11 whether or not the main input video selection button 31, the main effect selection button 32, the sub input video selection button 33 or the sub effect selection button 34 is newly operated. If a YES is outputted at the decision step S11, then control goes to the next decision step S12, whereat it is determined whether or not such operation is operation of the input video selection button 31 (that is, operation concerning the input buses 5a and 5b (main input bus 1 and main input bus 2)) or operation of the main effect selection button 32 (that is, operation concerning the main image synthesizing unit 6).

If a YES is outputted at the decision step S12, then control goes to a step S13, whereat the control unit 27 transmits a signal to instruct the operation of the input buses 5a, 5b of the input selection unit 5 or the main image synthesizing unit 6 to the control unit 4 within the switcher body 1 together with a signal indicating the designated state of the present circuit block at the circuit block designation button 38 in the present available mode and the half-divide mode (that is, a signal indicating that the main circuit block is designated in the half-divide mode) in response to the contents of the operation. Then, control goes back to the step S11. If on the other hand a NO is outputted at the decision step S12, then the control unit 27 does not transmit a signal to the control unit 4 and control goes back to the step S11.

Figure 12:
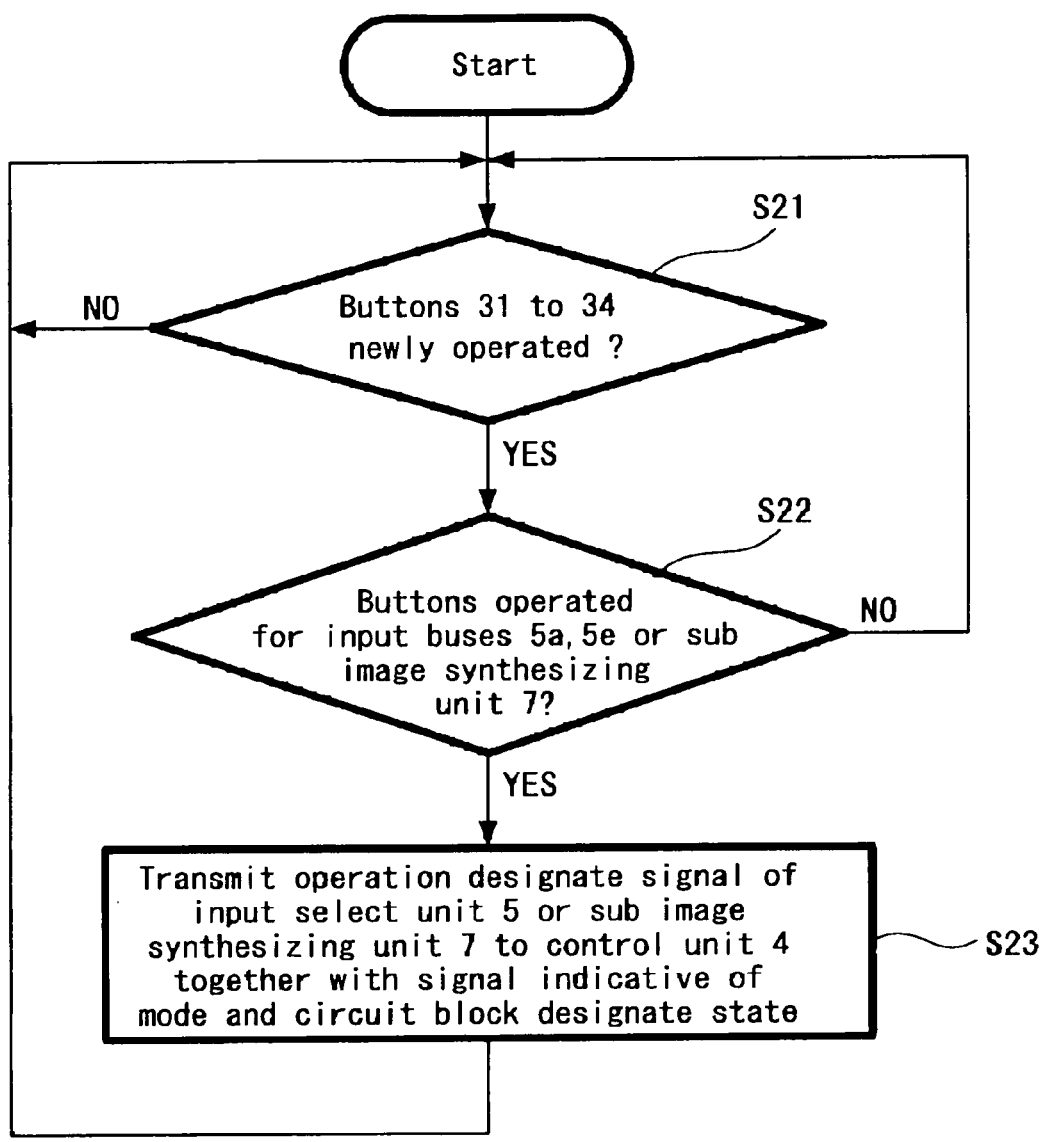
FIG. 12 is a flowchart to which reference will be made in explaining processing executed by the control unit of the control panel in the half-divide mode.

FIG. 12 is a flowchart showing processing executed when the sub circuit block is designated by the circuit block designation button 38 in the hall-divide mode. Referring to FIG. 12 and following the start of operation, it is determined at a decision step S21 whether or not the main input video selection button 31, the main effect selection button 32, the sub input video selection button 33 or the sub effect selection button 34 is newly operated. If a YES is outputted at the decision step S21, then control goes to the next decision step S22, whereat such operation is operation of the sub input video selection button 33 (that is, operation concerning the input buses 5d and 5e (sub input bus 1 and sub input bus 2)) or operation of the sub effect selection button 34 (that is, operation concerning the sub image synthesizing unit 7).

If a YES is outputted at the decision step S22, then control goes to a step S23, whereat the control unit 27 transmits a signal to instruct the operation of the input buses 5d, 5e of the input selection unit 5 or the sub image synthesizing unit 7 to the control unit 4 within the switcher body 1 together with a signal indicating the designated state of the present circuit block at the circuit block designation button 38 in the present available mode and the half-divide mode (that is, a signal indicating that the sub circuit block is designated in the half-divide mode) in response to the contents of the operation. Then, control goes back to the step S21. If on the other hand a NO is outputted at the decision step S22, then the control unit 27 does not transmit a signal to the control unit 4 and control goes back to the step S21.

Figure 13:
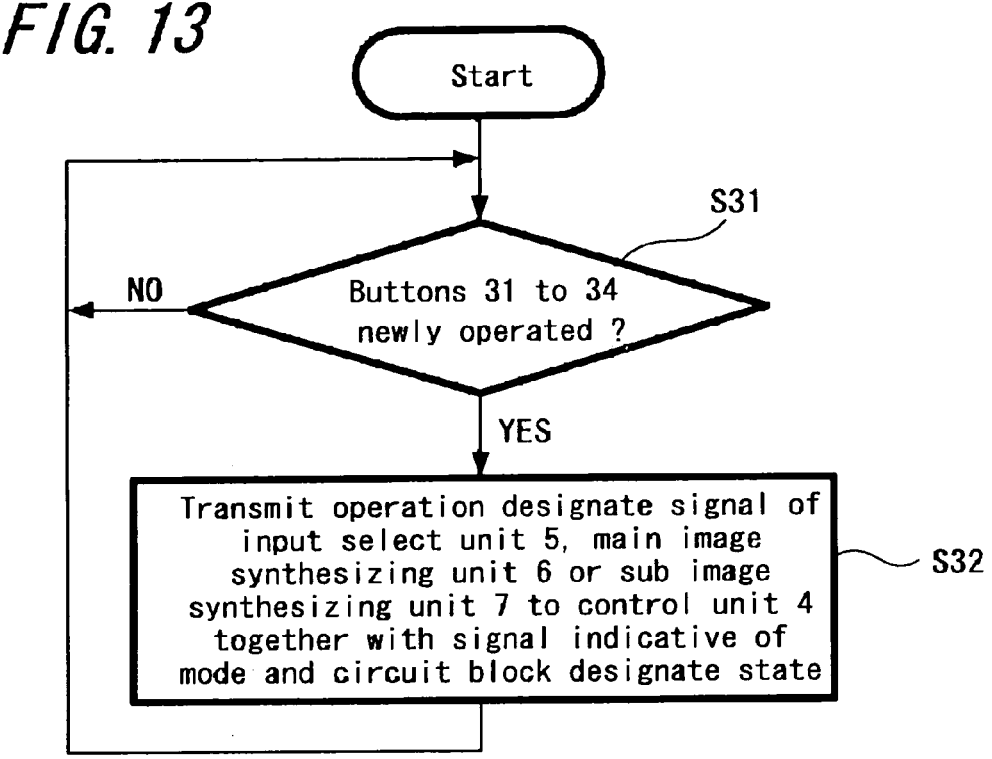
FIG. 13 is a flowchart to which reference will be made in explaining processing executed by the control unit of the control panel in the half-divide mode.

FIG. 13 is a flowchart showing processing executed when both of the main circuit block and the sub circuit block are designated by the circuit block designation button 38 in the half-divide mode. Referring to FIG. 13 and following the start of operation, it is determined at a decision step S31 whether or not the main input video selection button 31, the main effect selection button 32, the sub input video selection button 3 or the sub effect selection button 34 is newly operated. If a YES is outputted at the decision step S31, then control goes to a step S32, whereat the control unit 27 transmits a signal to instruct the operation of the input selection unit 5, the main image synthesizing unit 6 or the sub image synthesizing unit 7 to the control unit 4 within the switcher body 1 together with a signal indicating the designated state of the present circuit block at the circuit block designation button 38 in the present available mode and the half-divide mode (that is, a signal indicating that both of the main circuit block and the sub circuit block are designated in the half-divide mode) in response to the contents of the operation. Then, control goes back to the step S31.

FIGS. 14, 15, 16 and 17 are flowcharts showing processing executed by the control unit 4 within the switcher body 1 based on the signals transmitted at the step S3 in FIG. 10, the step S13 in FIG. 11, the step S23 in FIG. 12 and the step S32 in FIG. 13.

Figure 14:
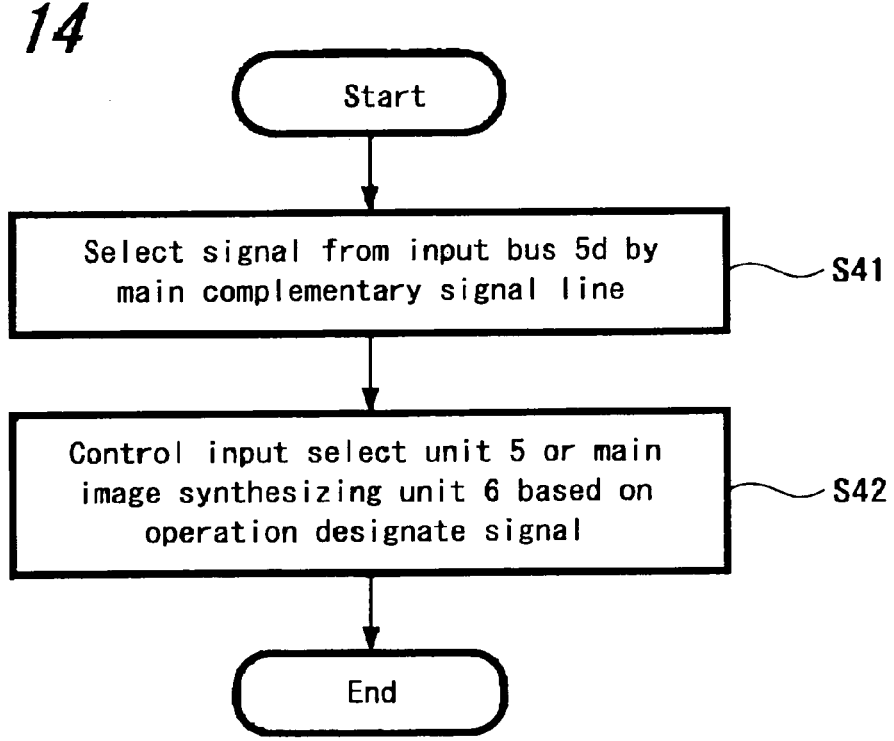
FIG. 14 is a flowchart to which reference will be made in explaining processing executed by a control unit of a switcher body in the standard mode.

Referring to FIG. 14 and following the start of operation, control goes to a step S41, whereat a video signal from the input bus 5d (sub input bus 1) of the input selection unit 5 is selected by the main complementary signal line 9c of the synthesize selection unit 9 (FIG. 3) based on a signal indicative of the standard mode. Then, control goes to a step S42, whereat the input selection unit 5 or the main image synthesizing unit 6 is controlled in response to an operation instruction signal. Then, control is ended.

Figure 15:
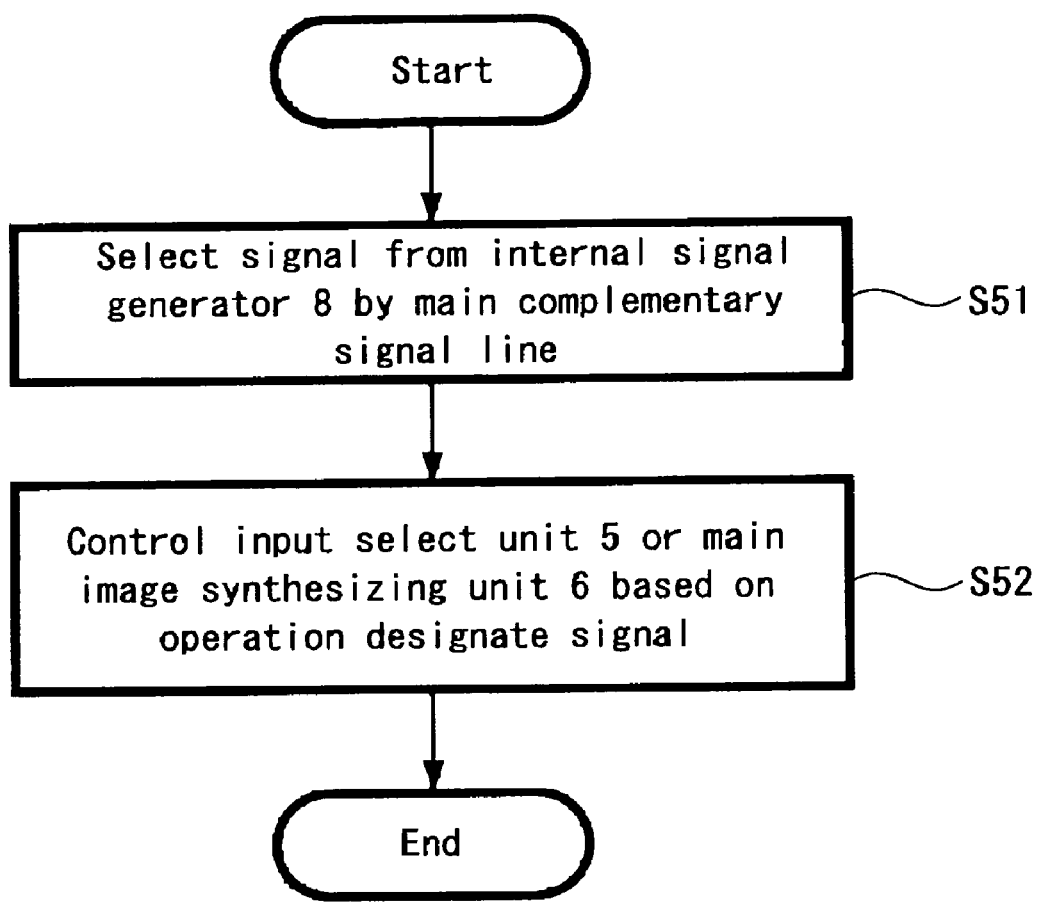
FIG. 15 is a flowchart to which reference will be made in explaining processing executed by the control unit of the switcher body in the half-divide mode.

Referring to FIG. 15 and following the start of operation, control goes to a step S51, whereat a main internal generated signal from the internal signal generator 8 is selected by the main complementary signal line 9c of the synthesize selection unit 9 (FIG. 3) based on a signal indicating that the main circuit block is designated in the half-divide mode. Then, control goes to a step S52, whereat the input selection unit 5 or the main image synthesizing unit 6 is controlled in response to an operation instruction signal. Then, control is ended.

Referring to FIG. 16 and following the start of operation, control goes to a step S61, whereat the main internal generated signal from the internal signal generator 8 is selected by the main complementary signal line 9c of the synthesize selection unit 9 (FIG. 3) based on a signal indicating that the sub circuit block is designated in the half-divide mode. Then, control goes to a step S62, whereat the input selection unit 5 or the sub image synthesizing unit 7 is controlled in response to an operation instruction signal. Then, control is ended.

Referring to FIG. 17 and following the start of operation, control goes to a step S71, whereat the main internal generated signal from the internal signal generator 8 is selected by the main complementary signal line 9c based on a signal indicating that both of the main circuit block and the sub circuit block are designated in the half-divide mode. Then, control goes to a step S72, whereat the input selection unit 5, the main image synthesizing unit 6 and the sub image synthesizing unit 7 are controlled in response to an operation instruction signal. Then, control is ended.

As described above, according to this image switching apparatus, when the available mode is set to the half-divide mode and any one of the main circuit block and the sub circuit block is designated by the circuit block designation button 38, the manner in which the video signal of one channel is controlled by the operation of the main circuit block of the image processing unit 3 or the manner in which the video signal of one channel is generated by the operation of the sub circuit block of the image processing unit 3 can be controlled.

On the other hand, when the available mode is set to the half-divide mode and both of the main circuit block and the sub circuit block are designated by the circuit block designation button 38, it is possible to simultaneously control the manner in which the video signal of one channel is generated by operating the main circuit block and the manner in which the video signal of one channel is generated by operating the sub circuit block.

One image processing unit 3 within the same image switching apparatus can be made available by the operation of the same control panel 2 for the purpose of generating the video signal of one channel by only the main circuit block and for the purpose of generating video signals of two channels by both of the main circuit block and the sub circuit block. Then, the same circuits and the like (output lines 25a to 25f of the limited number, key processing units 11 to 14 of the limited number, etc.) within this image processing unit 3 may be made common to the main circuit block and the sub circuit block. Further, the input bus 5d of the input selection unit 5 which is the common circuit in the sub circuit block may be made common for use as the application to the sub circuit block and for use as the application to a part of the main circuit block.

Thus, not only the image switching apparatus can be used in a variety of purposes but also the image switching apparatus can be constructed by a few circuits and elements and the circuits and elements can be efficiently used without waste in accordance with the change of the purpose.

Also, in the standard mode, since the video signal from the input bus 5d (sub input bus 1) is selected by the main complementary signal line 9c of the synthesize selection unit 9 and supplied to the main image synthesizing unit 6, this video signal is used as a wipe border fill of the wipe border (FIG. 4B) in the main image synthesizing unit 6 and the like (step S31 shown in FIG. 14). However, in the half-divide mode, since the video signal from the input bus 5d is not selected by the main complementary signal line 9c, it is not supplied to the main image synthesizing unit 6 (step S41 shown in FIG. 16 and step S51 shown in FIG. 17).

Thus, when different operators operate the main circuit block and the sub circuit block in the half-divide mode, for example (when different operators operate the main input video selection button 31 and the sub input video selection button 33 shown in FIG. 7), it is possible to prevent the operator on the main circuit block side from using an unintended video signal (that is, video signal selected by the operator on the sub circuit block side) as the wipe border fill and the like.

"Bus Toggle"

"Bus toggle" in the setup items shown in FIG. 9 is an item to set a bus toggle mode which will be described below.

When the present video signal is completely switched to the next video signal in the main image synthesizing unit 6 and the sub image synthesizing unit 7 based on the operation of the fader lever 35 (FIG. 7) like the pictures displayed on the right-hand ends of FIGS. 4A to 4C, this time, the present video signal and the next video signal should be swapped with each other in such a manner that the next video signal may be used as a new present video signal (target video signal that is to be switched by the new next video signal). As a method thereof, the following two methods are available in the image processing unit 3.

(1): The video signals selected by the main input bus 1 and the main input bus 2 may be swapped with each other by the input selection unit 5 such that the video signals selected by the input bus 5a (main input bus 1) and the input bus 5b (main input bus 2) may be selected, this time, by the input bus 5b (main input bus 2) and the input bus 5a (main input bus 1). While the input buses 5a and 5b was described so far, this relationship will apply for the input buses 5d and 5e (sub input buses 1 and 2) as well.

(2): The video signals selected by the main present output signal line 9a and the main next output signal line 9b are swapped with each other by the synthesize selection unit 9 in such a manner that the video signals selected by the main present output signal line 9a and the main next output signal line 9b may be selected, this time, by the main next output signal line 9b and the main present output signal line 9a. While the main present output signal line 9a and the main next output signal line 9b were described so far, this relationship will apply for the sub present output signal line 9d and the sub next output signal line 9e as well.

The above-described method (1) uses the video signal, which is constantly selected by the same input bus of the main input bus 2, as the present video signal. Also, the video signal which is constantly selected by the same bus of the sub input bus 1 and the sub input bus 2 is used as the present video signal.

According to the above-described method (2), the manner in which the video signal selected by the main input bus 1 or the main input bus 2 is used as the present video signal is changed alternately. Also, the manner in which the video signal selected by the sub input bus 1 or the sub input bus 2 is used as the present video signal is changed alternately.

The bus toggle is the setting to use either the above-described method (1) or (2). When the bus toggle mode is set to ON, the above-described method (1) is adopted. When the bus toggle mode is set to OFF, the above-described method (2) is adopted.

The GUI unit 29 independently sets the bus toggle mode in the input bus 5a and the input bus 5b (main input bus 1 and main input bus 2) of the main circuit block and the input bus 5d and input bus 5e (sub input bus 1 and sub input bus 2) of the sub circuit block.

The control unit 27 within the control panel 2 transmits signals indicative of bus toggle mode setting results of each of the main circuit block and the sub circuit block to the control unit 4 within the switcher body 1.

The control unit 4 within the switcher body 1 independently swaps the present video signal and the next video signal based on the above signals when the present video signal is completely switched to the next video signal by the main image synthesizing unit 6 and when the present video signal is completely switched to the next video signal by the sub image synthesizing unit 7.

Figure 18:
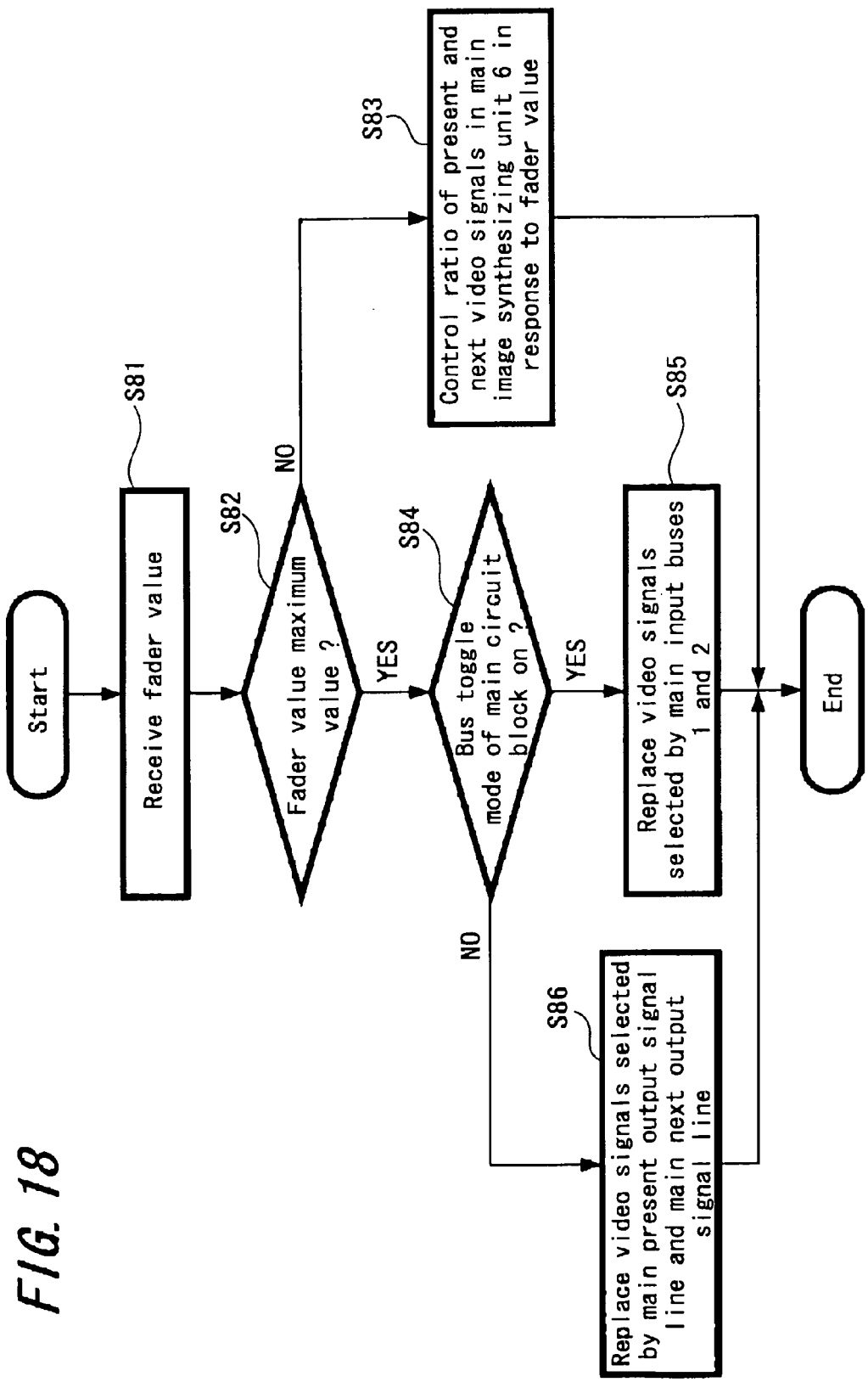
FIG. 18 is a flowchart to which reference will be made in explaining the control unit of the switcher body concerning bus toggle mode.

FIG. 18 is a flowchart showing processing that is executed by the control unit 4 in association with the setting of this bus toggle mode with respect to the main circuit block. Referring to FIG. 18 and following the start of operation, control goes to a step S81, whereat a signal indicative of a fader value (moved amount of the fader lever 35) is received from the control unit 27 within the control panel 20. Then, control goes to the next decision step S82, whereat it is determined whether or not the received fader value is the maximum value (value at which the present video signal is completely switched to the next video signal).

If a NO is outputted at the decision step S82, then control goes to a step S83, whereat a ratio between the present video signal and the next video signal in the main image synthesizing unit 6 is adjusted. Then, control is ended.

If a YES is outputted at the decision step S82, then control goes to the next decision step S84, whereat it is determined whether or not the bus toggle mode with respect to the main circuit block is set to ON.

If a YES is outputted at the decision step S84, then control goes to a step S85, whereat the video signals selected by the input bus 5a (main input bus 1) and the input bus 5b (main input bus 2) of the input selection unit 5 are swapped with each other as was already described in the above-described method (1). Then, control is ended.

If a NO is outputted at the decision step S84, then control goes to a step S86, whereat the video signals selected by the main present output signal line 9a and the main next output signal line 9b of the synthesize selection unit 9 are swapped with each other as was already described in the above-described method (2). Then, control is ended.

With respect to the sub circuit block in the half-divide mode, the control circuit 4 executes processing similar to that shown in FIG. 18 while it swaps the control target of the portion of the step S83 with the sub image synthesizing unit 7, it swaps the judgment target at the portion of the step S84 with the setting result of the bus toggle mode with respect to the sub circuit block, it swaps the control target at the portion of the step S85 with the input buses 5d and 5e (sub input buses 1 and 2) and it swaps the control target at the portion of the step S86 with the sub present output signal line 9d and the sub next output signal line 9e.

As described above, since the bus toggle mode is independently set in the main circuit block and the sub circuit block, when the different operators operate the main circuit block and the sub circuit block in the half-divide mode, for example (when different operators operate the main input video selection button 31 and the sub input video selection button 22 shown in FIG. 7), it is possible to prevent one operator from becoming unable to understand which of the two input buses (main input bus 1 and main input bus 2 on the main circuit block side and sub input bus 1 and sub input bus 2 on the sub circuit block side) selects the present video signal based on the setting result brought by the other operator.

"Split Fader Enable"

"Split fader enable" in the setup items shown in FIG. 9 is an item to make the operation for separately moving the levers 35a and 35b, separated by the joint button 35c, of the fader lever 35 shown in FIG. 8 become effective or ineffective when the bus toggle mode is set to OFF in the setup item "bus toggle" (operation for independently adjusting the ratio of the present video signal and the ratio of the next video signal).

If this operation is set to be effective, then when the levers 35a and 35b, for example, are moved to their ends of the opposite sides, it becomes possible to make both of the ratio of the present video signal and the ratio of the next video signal become 0% (to display a black picture) and also to make both of the ratio of the present video signal and the ratio of the next video signal become 100% (to display a picture in which the present video signal and the next video signal are synthesized completely).

The GUI unit 29 independently sets this split fader enable in the main image synthesizing unit 6 which is the main circuit block and in the sub image synthesizing unit 7 which is the sub circuit block.

While this operation is set to be effective with respect to the main circuit block, for example, if this operation is not set to be effective with respect to the sub circuit block, then when the main circuit block is designated by the circuit block designation button 38, the control unit 27 within the control panel 2 transmits the signals to change the ratios of the present video signal and the next video signal at the main image synthesizing unit 6 in response to the moved amounts of the levers 35a and 35b to the control unit 4 within the switcher body 1. When the circuit block is designated by the circuit block designation button 38, the control unit 27 transmits a signal to the control unit 4 in response to the moved amount of only the lever 35a even if the levers 35a and 35b are respectively moved physically.

"Preset Color Mix"

"Preset color mix" in the setup items shown in FIG. 9 is an item to make the following items. These items will be set independently in the main circuit block and the sub circuit block.

(1): When the preset color mix shown in FIG. 4C is selected as the kind of effect (with respect to the main circuit block, the preset color mix is selected by the main effect selection button 32 shown in FIG. 7 and with respect to the sub circuit block, the preset color mix is selected by the sub effect selection button 34 shown in FIG. 7), the present video signal is set to be switched to the next video signal completely at any of one stroke (movement from one end to the other end) of the fader lever 35 and two strokes (moved again to the original end after moved from one end to the other end). In the case of one stroke, when the fader lever 35 is moved to the center, the video signal is switched to the video signal of single color. In the case of the two strokes, when the fader lever 35 is moved to other end, the video signal is switched to the video signal of single color.

(2): When the preset color mix is selected and the key signal is superimposed on the video signal, of the key signals of four channels from the key processing units 11 to 14 shown in FIG. 3, the channel of the key signal superimposed on the video signal of single color is to be set.

(3): After the preset color mix was completed, the kind of the next effect (effect executed by the main image synthesizing unit 6 with respect to the main circuit block and effect executed by the sub image synthesizing unit 7 with respect to the sub circuit block) to be executed is recalled to the effect executed immediately before the preset color mix or not (that is, to set whether or not the preset color mix is executed once).

"Fader Curve"

"Fader curve" in the setup items shown in FIG. 9 is an item to set a relationship between the actual moved amount of the fader lever 35 (FIG. 7) and the ratio between the present video signal and the next video signal to a linear (proportional) relationship or a nonlinear relationship. The setting of this fader curve is independently carried out in the main image synthesizing unit 6 which is the main circuit block and the sub image synthesizing unit 7 which is the sub circuit block.

Figure 19A:
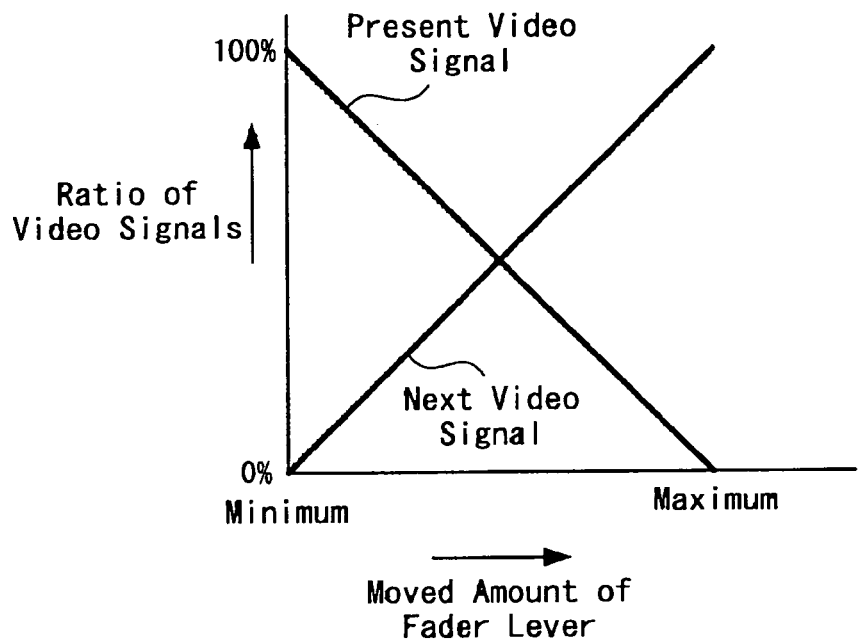
FIGS. 19A and 19B are respectively diagrams showing examples of fader curves to be set.
Figure 19B:
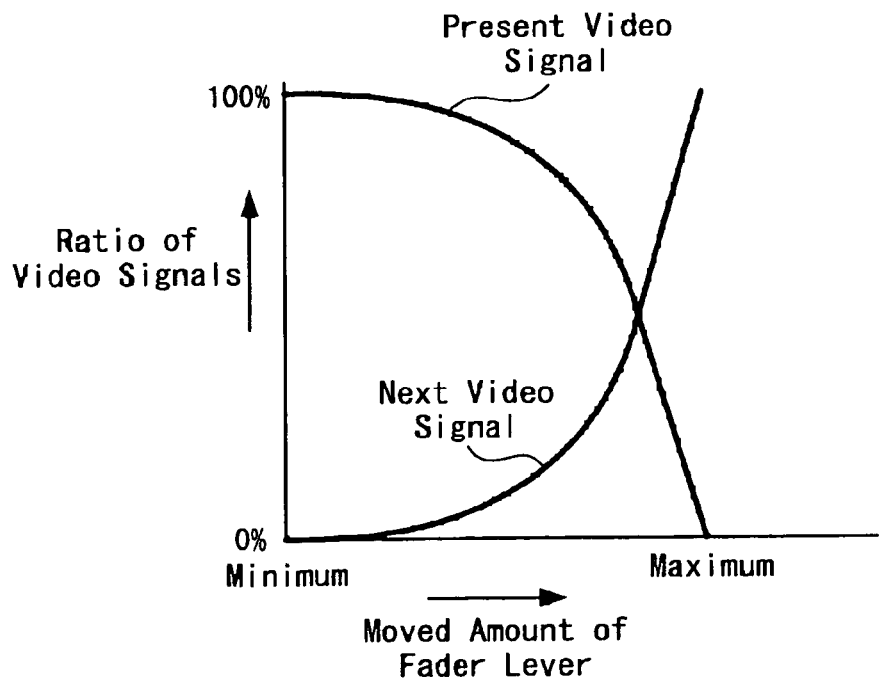

FIGS. 19A and 19B are diagrams showing moved amounts of the fader lever 35 and the ratios between the present video signal and the next video signal according to the setting of this fader curves. FIG. 19A is a diagram showing the case in which the above-described relationship is set to be linear relationship. FIG. 19B is a diagram showing the case in which the above-described relationship is set to be a nonlinear relationship (example in which an image is hardly switched until the fader lever 35 is moved to some extent, whereafter the image is rapidly switched).

"Background and Combination and Output of Key Signal"

"Background and combination and output of key signal" in the setup items shown in FIG. 9 is an item to make the following settings.

(1): Setting of combination in which any key signal of the key signals of four channels from the key processing units 11 to 14 is superimposed on the video signals (main background image and sub background image) outputted from the main image synthesizing unit 6 and the sub image synthesizing unit 7 shown in FIG. 3.

(2): Setting to transmit which of the video signals of the background image and the sub background image with the key signal superimposed thereon based on the setting of the above-described setting (1) and the video signals directly supplied from the main present output signal line 9a, the main next output signal line 9b, the sub present output signal line 9d and the sub next output signal line 9e of the synthesize selection unit 9 shown in FIG. 3 (the present video signal and the next video signal to generate the main background image and the present video signal and the next video signal to generate the sub background image) to which line of the output lines 25a to 25f shown in FIG. 3.

In the setting (1), in accordance with the number of systems (8 systems) of the cascade mix circuits 16 to 23 shown in FIG. 3, it is possible to set combinations of eight sets, at maximum, of the main background image or the sub background image and the key signals. Then, in the combination of each set, it is possible to combine a plurality of key signals (for example, key signals from the key processing units 11 and 12 can be combined with the background image). Also, the same key signal as that combined in the main background image in a certain set can be combined with the sub background image in other set (for example, in a certain set, the key signal from the key processing unit 11 can be combined with the main background image and in other set, the key signal from the key processing unit 11 can be combined with the sub background image).

Further, in the above-described setting (2), it is possible to supply the same video signal to more than two lines of the output lines 25a to 25f.

The control unit 27 within the control panel 2 transmits the signals indicative of the results of the above-described settings (1) and (2) to the control unit 4 within the switcher body 1.

The control unit 4 within the switcher body 1 may control the synthesized signal selection and switch unit 15 and the cascade mix circuits 16 to 23 based on the signal indicative of the result of the above-described setting (1) and also controls the output selection unit 24 based on the signal indicative of the result of the above-described setting (2).

When this "background and combination and output of key signal" is set, it is possible to easily customize the setting in which any video signal (main background image or sub background image with the key signal superimposed thereon, preview video signal and the like) is outputted from the output lines 25*a* to 25*f* of the limited number. Also, it is possible to flexibly customize the setting in response to the available mode of the image processing unit 3 (whether the mode is the standard mode or the half-divide mode or whether or not the operation of which circuit block is designated by the circuit block designation button 38 in the half-divide mode).

The manner in which the main side button group and the sub side button group of the preview button 36 shown in FIG. 8 may be used selectively will be described. Although the video signal transmitted to the respective output lines 25*a* to 25*f* is determined according to the above-described setting (2), since the input bus 5*e* (sub input bus 2) of the input selection unit 5 and the sub image synthesizing unit 7 are not operated and the input bus 5*d* (sub input bus 1) also is operated as part of the main circuit block in the standard mode, the present video signal and the next video signal to generate the main background image and the sub background image are not transmitted to the output lines 25*a* to 25*f*. On the other hand, in the half-divide mode, since both of the main circuit block and the sub circuit block are operated, the main background image and the sub background image also are transmitted to the output lines 25*a* to 25*f*.

The main side button groups of the preview selection button 36 are the buttons which are used to select the kind (for example, the next video signal) of the preview video signal of the main circuit block in the standard mode and in the half-divide mode.

The sub side button groups of the preview selection button 36 are the buttons which are used to select the kind of the preview video signal of the sub circuit block in the half-divide mode.

In the standard mode, the control unit 27 within the control panel 2 transmits only the selected results of the main side button group to the control unit 4 within the switcher body 1 neglecting the sub side button group of the preview selection button 36. In other cases, the control unit 27 transmits the selected results of the main side button group and the sub side button group of the preview selection button 36 to the control unit 4 within the switcher body 1. The control unit 4 controls the preview selection unit 26 (FIG. 3) based on this signal with reference to the above-described setting (2) in such a manner that it may select the signal of the designated kind of the designated side.

As a result, it is possible to display designated preview video signals (video signals outputted after switching and various kinds of video signals in response to the switching kind) which belong to the respective circuit blocks of the main circuit block and the sub circuit block on the preview monitor (not shown).

"Snapshot"

"Snapshot" in the setup items shown in FIG. 9 is an item to set whether or not "available mode" and "background and combination and output of key signal" of the setup items shown in FIG. 9 are contained in the recalled setup items when the setting is recalled to the setting state of the past time point in the GUI unit 29 by the snapshot button 40 shown in FIG. 7.

When the recall operation is carried out by the snapshot button 40, the control unit 27 within the control panel 2 recalls the setting states of the setup items other than "available mode" and "background and combination and output of key signal" and the setting states of the items contained in the items recalled by the setting of this snapshot to the setting state of the past time point (when the setting state is stored by the snapshot button 40) in the GUI unit 29.

Thus, it is possible for the operator to arbitrarily determine whether or not the settings of "available mode" and "background and combination and output of key signal" may be executed by only the GUI unit 29 (whether or not the setting is not changed by the snapshot button 40).

In the GUI unit 29, other items than the items shown in FIG. 9 may be used in order to set up various items to operate the image processing unit 3. Then, as these items, there may exist "bus toggle", "split fader enable", "preset color mix", "fader curve" and items independently set by the main circuit block and the sub circuit block, such as the settings with respect to the main image synthesizing unit 6 and the sub image synthesizing unit 7 and the settings with respect to the main internal generated signal and the sub internal generated signal outputted from the internal signal generator 8.

The copy/swap button 41 shown in FIG. 7 is a button which is used to copy the present setting state of the main circuit block and the sub circuit block to the remaining one or to replace (swap) the present setting state of the main circuit block and the present setting state of the sub circuit block with each other.

However, since specifications of the hardware of the main image synthesizing unit 6 and the sub image synthesizing unit 7 are different from each other and the main internal generated signal and the sub internal generated signal that can be outputted from the internal signal generator 8 are different from each other (for example, although any of the video signal of single color and the video signal of mixed color of two colors can be selected as the main internal generated signal, the sub internal generated signal is limited to only the video signal of the single color), there may exist various kinds of setup items of which settings may not be copied or swapped between the main circuit block and the sub circuit block physically. As other example, it is frequently observed that the sub side has lesser kind of selection branch to select effects because of difference in hardware between the main side and the sub side.

The control unit 27 within the control panel 2 stores in advance the setup items which may not be physically copied or swapped in the internal memory. When the copy operation and the swap operation are carried out by the copy/swap button 41, the control unit 27 may copy and swap only the settings of the items other than those stored items. Alternatively, when the number of selection branches to select effects is different, if the common selection branch is selected by the main side and the sub side, then such common selection branch may be copied and swapped. If the selection branch which is not common in the main side and the sub side is selected (such selection branch may not be applied), it is not copied and swapped.

As a result, it is possible for the operator to copy or swap only the setting state which may be physically copied and swapped by performing the copy operation and the swap operation without consciousness of a difference between the specifications of the main circuit block side and the sub circuit block side.

Next, "default recall" and "link" will be described as functions which should be desirably installed on this image switching apparatus except various kinds of functions (macro function, snapshot and copy/swap) that have been described so far.

"Default Decall"

"Default recall" is a function to recall the setting states of all setup items to the predetermined initial setting states (for example, the setting states obtained upon delivery from the factory). In this image switching apparatus, since the main circuit block and the sub circuit block are operated separately, it is desirable that the setting state should be recalled to the initial setting state separately in each of the main circuit block and the sub circuit block.

However, if a default recall button for the main circuit block and a default recall button for the sub circuit block are separately provided in the operation input unit 28 of the control panel 2, then it is unavoidable that such buttons having functions which are rarely used at ordinary times will share the extra space of the panel surface of which space is limited.

Accordingly, in the broadcast station, for example, the default recall button is provided on other apparatus which is installed adjacent to this image switching apparatus. Then, it is desired that at the same time the default button is operated, the circuit block to be recalled to the initial setting state (any one of the main circuit block and the sub circuit block and both of the main circuit block and the sub circuit block) is designated by the circuit block designation button 38 shown in FIG. 7, the control unit 27 within control panel 2 should perform processing to recall the designated circuit block to the initial setting state.

As a consequence, it becomes possible to realize default recall by using the circuit block designation button 38 without providing new buttons on the operation input unit 28.

"Link"

"Link" is a function by which the remaining image switching apparatus is linked with one image switching apparatus to carry out the same operation when one image switching apparatus is operated between the two image switching apparatus (when the present video signal is switched to the next video signal or the key signal is superimposed on the video signal). However, according to the present invention, it is assumed that when one circuit block of the main circuit block and the sub circuit block is operated by operating the operation input unit 28, the remaining one circuit block is operated in the same manner.

Settings to determine the main circuit block and the sub circuit block as a link destination (circuit block linked to be operated) and to link the kind of operation (switching of the video signal at the main image synthesizing unit 6 and sub image synthesizing unit 7 and superimposing of key signal on main background image and sub background image by the cascade mix circuits 16 to 23) may be included in the setup items at the GUI picture 29.

However, as was already described in the portion of the setup items "background and combination and output of key signal", the combination of the key signals superimposed on the main background image and the sub background image may be set arbitrarily. Therefore, although there exist combinations of key signals superimposed on the main background image (for example, four key signals from the key processing units 11 to 14), it is frequently observed that no combinations of key signals superimposed on the sub background image may exist.

In that case, when the link is set in the GUI picture 29, although the link destination of the superimposing operation of the key signal can be set to the main circuit block (setting in which the key signal is not superimposed on the main background image in unison with the setting in which the key signal is not superimposed on the sub background image), it is desirable that the sub circuit block should not be set the link destination (setting in which the same key signal is superimposed on the main background image in unison with the setting in which the key signal is superimposed on the sub background image may not be made). If such setting operation is carried out, the control unit 27 within the control panel 2 may reject such setting.

Also, for example, it is frequently observed that the combination in which the key signal is superimposed on the main background image may be exactly the same as that in which the key signal is superimposed on the sub background image (for example, in both combinations, the key signals are the two key signals from the key processing units 11 and 12).

In that case, since the same key signal is superimposed on the main background image and the sub background image without setting the link destination concerning the superimposing operation of the key signal, when the link is set on the GUI picture 29, it is desirable that the link concerning the superimposing operation of the key signal should not be set (even when the setting operation is performed, the control unit 27 within the control panel 2 refuses such setting).

Modified examples such as buttons on the operation input unit 28 and the setting of the fader separation function will be described as modified examples of the arrangement and function of the above-described image switching apparatus.

"Modified Examples of Buttons on the Operation Input Unit 28"

While the fader lever 35 of buttons on the operation input unit 28 is made common to the main circuit block side and the sub circuit block side in the example shown in FIG. 7, the buttons for selecting input images and the buttons for selecting the kind of effects are provided as the separate buttons on the main circuit block side and the sub circuit block side (main input video selection button 31, sub input video selection button 33 and main effect selection button 32 and sub input video selection button 33). However, as an alternative example, the input video selection button and the effect selection button may be made common to the main circuit block side and the sub circuit block side.

Figure 20:
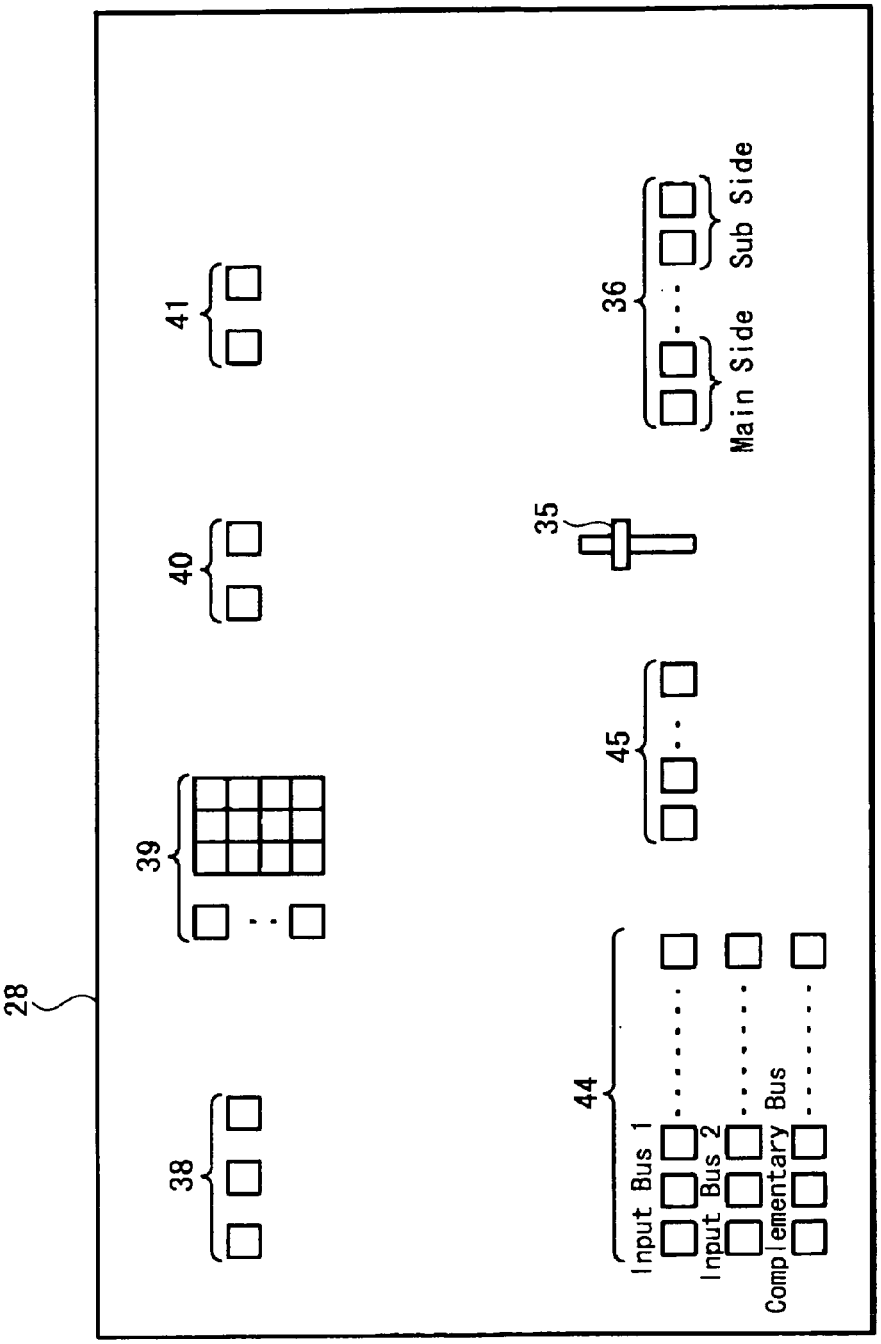
FIG. 20 is a schematic diagram showing another example of suitable means such as buttons provided on the operation input unit shown in FIG. 6.

FIG. 20 is a schematic diagram showing an example in which common input video selection button 44 and effect selection button 45 are provided (fader lever 35 and buttons 36 and 38 to 41 are exactly the same as those shown in FIG. 7). When the input video selection button 44 and the effect selection button 45 are depressed, a signal which controls any one of the main circuit block side and the sub circuit block side may be transmitted in response to the designation at the circuit block designation button 38.

The input video selection button 44 will be described first. In the standard mode, the input video selection button 44 has a function to select video signals by the input buses 5*a* and 5*b* (main input bus 1 and main input bus 2) and 5*d* (sub input bus 1) of the input selection unit 5 shown in FIG. 3 (the control unit 27 (FIG. 6) within the control panel 2 transmits the corresponding signal to the control unit 4 within the switcher body 1). A button train "input bus 1" has a function to select the video signal of the input bus 5*a*, a button train "input bus 2" has a function to select the video signal of the input bus 5*b* and a button train "complementary bus" has a function to select the video signal of the input bus 5*d*.

When the main circuit block is designated by the circuit block designation button 38 in the half-divide mode, the input video selection button 44 has a function to select the video signals by the input buses 5a and 5b (main input bus 1 and main input bus 2) of the input selection unit 5 shown in FIG. 3. The button train "input bus 1" has a function to select the video signal of the input bus 5a and the button train "input bus 2" has a function to select the video signal of the input bus 5b. The button train "complementary bus" has no function in this case and nothing occurs even when this button train "complementary bus" is depressed.

When the sub circuit block is designated by the circuit block designation button 38 in the half-divide mode, the input video selection button 44 has a function to select the video signals by the input buses 5a and 5b (sub input bus 1 and sub input bus 2) of the input selection unit 5 shown in FIG. 3. The button train "input bus 1" has a function to select the video signal of the input bus 5d and the button train "input bus 2" has a function to select the video signal of the input bus 5e. The button train "complementary bus" has no function in this case and nothing occurs even when the button train "complementary bus" is depressed.

Also, when both of the main circuit block and the sub circuit block are designated by the circuit block designation button 38, the input video selection button 44 is operated similarly to the case in which only the main circuit block is designated by the circuit block designation button 38. That is, the input video selection button 44 has a function to select the video signals by the input buses 5a and 5b (main input bus 1 and main input bus 2) of the input selection unit 5 shown in FIG. 3.

The effect selection button 45 will be described next. In the standard mode, the effect selection button 45 is composed of a plurality of push buttons to select the kind (wipe and the like shown in FIGS. 4A to 4C) of effects in the main image synthesizing unit 6 shown in FIG. 3.

When the main circuit block is designated by the circuit block designation button 38 in the half-divide mode and when both of the main circuit block and the sub circuit block are designated by the circuit block designation button 38 in the half-divide mode, the effect selection button 45 has a function to select the kind (wipe and the like shown in FIGS. 4A to 4C) of effects in the main image synthesizing unit 6 shown in FIG. 3.

When the sub circuit block is designated by the circuit block designation button 38 in the half-divide mode, the effect selection button 45 has a function to select the kind of effects in the sub image synthesizing unit 7 shown in FIG. 3.

If the operation input unit 28 has the arrangement shown in FIG. 20, then the control unit 27 registers not only data indicative of the operation of the fader lever 35 but also data indicative of the circuit block designated by the circuit block designation button 38 in the macro register when operations of the input video selection button 44 and the effect selection button 45 are stored upon macro registration. Then, upon macro execution, regardless of the circuit block designated by the circuit block designation button 38 at the time point in which the macro is executed, the control unit 27 judges that the operations of the input video selection button 44 and the effect selection button 45 in the operation procedure read out from the macro register are operations performed on the circuit block designated by the circuit block designation button 38 at the time point in which macro is registered and the control unit 27 transmits the signal to operate the image processing unit 3 to the control unit 4 (FIG. 2) within the switcher body 1.

"Setting of Fader Separation Function"

In the description of the above-described "split fader enable", when the levers 35a and 35b shown in FIG. 8 are separated from each other in use, the control target is any one of the main image synthesizing unit 6 or the sub image synthesizing unit 7 and the lever 35a is used to instruct the ratio of the present video signal, the lever 35b being used to instruct the ratio of the next video signal. In addition, when the control unit 27 is provided with the setting of the fader separation function, it becomes possible to select any one of the mode (referred to as a "video independent control mode") for independently controlling the ratios of the two video signals (present video signal and next video signal) and the mode (referred to as a "main and sub instruction mode") for instructing the ratios of the two video signals to both of the main image synthesizing unit 6 and the sub image synthesizing unit 7 at the same time.

When the image switching apparatus is operated in the half-divide mode, if the mode is set to this main and sub instruction mode, it is possible to control the ratio of the two video signals in the main image synthesizing unit 6 by operating the lever 35a and also it is possible to control the ratio of the two video signals at the sub image synthesizing unit 7 by simultaneously operating the lever 35b. Also, when the levers 35a and 35b are joined as one body by the joint button 35c in this state, it becomes possible to constantly instruct the same ratio to the main image synthesizing unit 6 and the sub image synthesizing unit 7. In this manner, the same levers 35a and 35b can be separately used in response to the purposes. Also, when the control unit 27 includes the fader separation function setting, operations required when the fader lever 35 is separated can be changed in response to the purposes and hence it is possible to improve operation property economically.

In the above-mentioned examples, the input bus 5d (sub input bus 1) of the sub input bus of the input selection unit 5 of the image processing unit 3 serves as the common input bus which is available as a part of the main input bus. However, as another example, not only the input bus 5d but also the input bus 5e (sub input bus 2) may be used as the common input bus. In addition to the above-mentioned examples, circuits may be added to one of the main side and the sub side. For example, even when a circuit concerning key processing may be added to only one side or a signal generator may be added to only one side, the present invention can be applied to such modified example.

Further, the number of input buses of the input selection unit 5 shown in FIG. 3, the number of the video signal input lines, the number of the key processing units and the number of the video signal output lines are determined by way of example and they can be changed freely. Thus, it is needless to say that the present invention can be applied to an image switching apparatus including video signal input lines, key processing units and video signal output lines of which numbers are different from the above-described numbers.

According to the present invention, not only the image switching apparatus can be used in a variety of purposes but also the image switching apparatus can be constructed by a few circuits and such circuits can be efficiently used without waste in response to the change of purposes.

It should be understood by those skilled in the art that various modifications, combinations, sub-combinations and alterations may occur depending on design requirements and other factors insofar as they are within the scope of the appended claims or the equivalents thereof.

What is claimed is:

1. An image switching apparatus comprising:

an image processing unit for selecting a video signal from inputted video signals of a plurality of channels and switching an outputted video signal from a certain selected video signal to other selected video signal, a control unit for controlling said image processing unit; and an operation unit including operation means connected to said control unit through a communication channel to operate said image processing unit, wherein said image processing unit includes a main circuit block and sub circuit blocks different from said main circuit block as circuit blocks for carrying out said processing, said main circuit block includes designation means for designating that one of said sub circuit blocks is to be operated or that both of said main circuit block and said sub circuit blocks are to be operated, said operation unit transmits a signal to designate operation of said main circuit block to said control unit based on operation of said operation means when said main circuit block is designated by said designation means, said operation unit transmits a signal to designate operation of said sub circuit block to said control unit based on operation of said operation means when said sub circuit block is designated by said designation means and said operation unit transmits a signal to designate operations of both of said main circuit block and said sub circuit block to said control unit based on operation of said operation means when both of said main circuit block and said sub circuit block are designated by said designation means and said control unit controls a circuit of which operation is designated by a signal from said operation unit from said main circuit block and said sub circuit block.

2. An image switching apparatus according to claim 1, wherein at least a part of a circuit of said sub circuit blocks is a common circuit which is also available as a part of said main circuit block, said operation unit further includes setting means for setting an available mode of said image processing unit to a standard mode or a half-divide mode, said designation means is means for designating said main circuit block or said sub circuit blocks in said half-divide mode and said operation unit transmits a signal to designate operations of said main circuit block and said common circuit to said control unit based on operation of said operation means in said standard mode.

3. An image switching apparatus according to claim 1, wherein said image processing unit includes an input selection unit for selecting video signals from inputted video signals of a plurality of channels by a plurality of input buses and an image synthesizing unit for switching an outputted video signal from a certain video signal selected by said input selection unit to a different video signal selected by said input selection unit, said input selection unit includes more than two input buses which are main input buses constructing said main circuit block, more than two remaining input buses which are sub input buses constructing said sub circuit block and more than one input bus of said sub input buses which are available as a part of said main input buses, said image synthesizing unit includes a main image synthesizing unit for switching an outputted video signal from a certain video signal selected by said main input bus to a different video signal selected by said main input bus and a sub image synthesizing unit for switching an outputted video signal from a certain video signal selected by said sub input bus to a different video signal selected by said sub input bus, said main image synthesizing unit constructs said main circuit block and said sub image synthesizing unit constructs said sub circuit block.

4. An image switching apparatus according to claim 3, wherein said operation unit further includes setting means for independently carrying out the setting to change alternately the processing in which video signals selected by specific first and second main input buses of said main input buses are constantly used as video signals obtained before being switched and obtained after being switched by said main image processing unit or the processing in which video signals selected by any one of said first and second main input buses are used as video signals obtained before being switched and video signals obtained after being switched each time switching at said main image processing unit is completed and the setting to change alternately the processing in which video signals selected by specific first and second sub input buses of said sub input buses are constantly used as video signals obtained before being switched and obtained after being switched by said sub image processing unit or the processing in which video signals selected by any one of said first and second sub input buses are used as video signals obtained before being switched and video signals obtained after being switched each time switching at said sub image processing unit is completed.

5. An image switching apparatus according to claim 1, wherein said operation unit further includes setting means for executing settings to operate said image processing unit independently in said main circuit block and said sub circuit block.

6. An image switching apparatus according to claim 5, wherein said operation means in said operation unit includes a fader lever having a function to independently change a ratio of one video signal of two video signals and a ratio of remaining one video signal as a fader lever to change a ratio of said two video signals which are to be switched by said image processing unit and said setting means includes means for independently setting that said function of said fader lever is to be executed when said main circuit block is operated and that said function of said fader lever is to be executed when said sub circuit block is operated.

7. An image switching apparatus according to claim 5, wherein said operation means in said operation unit includes a fader lever to change a ratio of two video signals to be switched by said image processing unit, said image processing unit can execute preset color mix in which a video signal of a predetermined color is switched to remaining one video signal of two video signals after one video signal of said two video signals was switched to said video signal of said predetermined color as a kind of switching processing of an outputted video signal and said setting means includes means for independently setting that switching of said outputted video signal to remaining one video signal is completed at either of a second stroke or a first stroke of said fader lever when said main circuit block executes said preset color mix and that switching of said outputted video signal to remaining one video signal is completed at a second stroke or a first stroke of said fader lever when said sub circuit block executes said preset color mix.

8. An image switching apparatus according to claim 7, wherein said image processing unit superimposes a key signal of any channel of key signals of a plurality of channels on a selected video signal and said setting means further includes means for independently setting a channel of a key signal superimposed on said video signal of said predetermined color of said key signals of a plurality of channels when said superimposing processing is executed on the video signal in which said preset color mix was executed by said main circuit block and setting a channel of a key signal superimposed on said video signal of said predetermined color of said key signals of a plurality of channels when said superimposing processing is executed on the video signal in which said preset color mix was executed by said sub circuit block.

9. An image switching apparatus according to claim 7, wherein said setting means further includes means for independently carrying out the setting whether or not the kind of the switching processing executed next by said main circuit block after said main circuit block has completed said preset color mix is recalled to the switching processing executed by said main circuit block immediately before said preset color mix and carrying out the setting whether or not the kind of the switching processing executed next by said sub circuit block after said sub circuit block has completed said preset color mix is recalled to the switching processing executed by said sub circuit block immediately before said preset color mix.

10. An image switching apparatus according to claim 5, wherein said operation means in said operation unit includes a fader lever to change a ratio of two video signals switched by said image processing unit and said setting means includes means for independently setting a relationship between a moved amount of said fader lever and the change of a ratio of said two video signals when said main circuit block is operated and a relationship between a moved amount of said fader lever and the change of a ratio of said two video signals when said sub circuit block is operated.

11. An image switching apparatus according to claim 5, wherein said operation unit further includes operation means for copying the present setting state of one of said main circuit block and said sub circuit block to a remaining one of said main circuit block and said sub circuit block and/or replacing the present setting state of said main circuit block and the present setting state of said sub circuit block and said control unit stores therein data indicative of impossible setting items which may not be set in the same manner by said main circuit block and said sub circuit block, said control unit executing said copying and/or replacing except said impossible setting items based on a signal transmitted from said operation unit by operating said operation means.

12. An image switching apparatus according to claim 1, wherein said image processing unit superimposes a key signal of any channel of key signals of a plurality of channels on a selected video signal and said operation unit further includes setting means for setting combinations in which a key signal of any channel of key signals of a plurality of channels is superimposed on the video signals selected by said main circuit block and said sub circuit block.

13. An image switching apparatus according to claim 12, wherein said image processing unit includes a plurality of output lines of video signals and said setting means is means for determining any lines of said output lines to which video signals with key signals superimposed thereon are to be supplied.

14. An image switching apparatus according to claim 12, wherein said operation unit further includes operation means for recalling the setting to operate said image processing unit to the setting state retained in the past time point and setting means for determining whether or not items recalled by said operation means contain the setting of combinations of said key signals.

15. An image switching apparatus according to claim 1, wherein said image processing unit includes a plurality of output lines of video signals, said control unit selects one preview video signal from said plurality of output lines and said operation means in said operation unit includes means for selecting a video signal from video signals processed by said main circuit block and means for selecting a video signal from video signals processed by said sub circuit block as means for selecting said preview video signal.

16. An image switching apparatus according to claim 1, wherein said operation unit includes a fader lever to change one of or both of a ratio between two video signals switched by said main circuit block and a ratio between two video signals switched by said sub circuit block and an exclusively-designed indicator for indicating a ratio between two videos signals switched by said main circuit block and a ratio between two video signals switched by said sub circuit block of said image processing unit.

17. An image switching apparatus according to claim 1, wherein said operation unit further includes processing means for storing therein data indicative of an operation procedure of said operation means together with data indicative of data designated by said designation means when said main circuit block or said sub circuit block is mis-operated and processing means for transmitting a signal to enable said stored block of said main circuit block and said sub circuit block to execute operation of said stored operation procedure to said control unit.

18. An image switching apparatus according to claim 1, wherein said operation means in said operation unit includes two fader levers which can be joined as one body in use as the fader lever to change the ratio between the two video signals switched by said image processing unit wherein one fader lever can be operated as means for instructing a ratio between two video signals of said main circuit block and the other fader lever can be operated as means for instructing a ratio between two video signals of said sub circuit block when said two fader levers are not joined as one body and separated in use.

19. An image switching apparatus according to claim 18, further comprising fader separation function setting means for setting a function obtained when said two fader levers are separated to a first function in which one fader lever instructs a ratio between the two video signals of said main circuit block and the other fader lever instructs a ratio between the two video signals of said sub circuit block and setting said function to a second function to independently control two video signals, a ratio of one video signal and a ratio of remaining one video signal being independently changed by each of separated fader levers relative to any one of said main circuit block or said sub circuit block when said two fader levers are separated in use if said second function is set by said fader separation function setting means.

20. In a method of controlling an image processing unit in an image switching apparatus comprising said image processing unit for selecting a video signal from inputted video signals of a plurality of channels and switching an outputted video signal from a certain selected video signal to other selected video signal, a control unit for controlling said image processing unit and an operation unit including operation means connected to said control unit through a communication channel to operate said image processing unit, wherein said image processing unit includes a main circuit block and sub circuit blocks different from said main circuit block as circuit blocks for carrying out said processing, said main circuit block includes designation means for designating that one of said sub circuit blocks is to be operated or that both of said main circuit block and said sub circuit blocks are to be operated, said operation unit transmits a signal to designate operation of said main circuit block to said control unit based on operation of said operation means when said main circuit block is designated by said designation means, said control method of controlling said image processing unit in said image switching apparatus comprising:
- a step in which said operation unit transmits a signal to designate operation of said sub circuit block to said control unit based on operation of said operation means when said sub circuit block is designated by said designation means and said operation unit transmits a signal to designate operations of both of said main circuit block and said sub circuit block to said control unit based on operation of said operation means when both of said main circuit block and said sub circuit block are designated by said designation means; and
- a step in which said control unit controls a circuit of which operation is designated by a signal from said operation unit from said main circuit block and said sub circuit block.

* * * * *